United States Patent
Linden et al.

(10) Patent No.: US 10,225,854 B2
(45) Date of Patent: Mar. 5, 2019

(54) ENHANCEMENTS TO RESOURCE ALLOCATION FOR MBSFN TRANSMISSION IN AN MBSFN AREA

(71) Applicant: Alcatel Lucent, Boulogne Billancourt (FR)

(72) Inventors: Gabriel Linden, Nozay (FR); Bruno Landais, Lannion (FR)

(73) Assignee: Alcatel Lucent, Nozay (FR)

( * ) Notice: Subject to any disclaimer, the term of this patent is extended or adjusted under 35 U.S.C. 154(b) by 48 days.

(21) Appl. No.: 14/781,190

(22) PCT Filed: Mar. 25, 2014

(86) PCT No.: PCT/EP2014/055986
§ 371 (c)(1),
(2) Date: Sep. 29, 2015

(87) PCT Pub. No.: WO2014/154707
PCT Pub. Date: Oct. 2, 2014

(65) Prior Publication Data
US 2016/0057766 A1    Feb. 25, 2016

(30) Foreign Application Priority Data
Mar. 29, 2013  (EP) .................... 13290075

(51) Int. Cl.
*H04W 72/12* (2009.01)
*H04W 4/06* (2009.01)
(Continued)

(52) U.S. Cl.
CPC ......... *H04W 72/1263* (2013.01); *H04W 4/06* (2013.01); *H04W 72/005* (2013.01);
(Continued)

(58) Field of Classification Search
None
See application file for complete search history.

(56) References Cited

U.S. PATENT DOCUMENTS 9,055,469 B2 * 6/2015 Xu ................. H04L 12/189
2005/0076369 A1 * 4/2005 Cai ................ H04L 12/185
725/62

(Continued)

FOREIGN PATENT DOCUMENTS

EP    2242232 A1    10/2010
EP    2 563 050 A1    2/2013
(Continued)

OTHER PUBLICATIONS

Ericsson, "Release of pre-empted E-RABs," 3rd Generation Partnership Project (3GPP), 3GPP TSG-RAN WG3 #70-bis, R3-110284, pp. 1-3, XP050497222, Dublin, Ireland, Jan. 17-21, 2011.*
(Continued)

Primary Examiner — Ayaz R Sheikh
Assistant Examiner — Faiyazkhan Ghafoerkhan
(74) Attorney, Agent, or Firm — Fay Sharpe LLP

(57) ABSTRACT

In an embodiment, there is provided a method for resource allocation to MBMS services for MBSFN transmission in an MBSFN Area in a mobile communication system, said resource allocation including an assessment of a list of MBMS sessions to be scheduled for said MBSFN transmission, a method wherein a Sequence Number SN is used for said assessment, said SN determining the rank of an MBMS session in a sequence of MBMS sessions scheduled by one or more BM-SC(s) for said MBMS services, said rank of said MBMS session in said sequence being used in said assessment to determine a rank of said MBMS session in said list.

14 Claims, 28 Drawing Sheets

| | Session parameters | | | | | MCE determined | |
|---|---|---|---|---|---|---|---|---|
| Session | ARP priority level | Pre-emptable | May trigger pre-eption | MBMS SA | QoS | Message sequence number (Approach2) | Required resources in MbsfnArea1 | Required resources in MbsfnArea2 |
| 1 | 2 | yes | No | {SAI1,SAI2} | | 1 | 3 | 1 |
| 2 | 1 | yes (no) | Yes | {SAI1,SAI2} | | 2 | 2 | 1 |
| 3 | 2 | no | Yes (no) | {SAI1,SAI2} | | 3 | 1 | 1 |
| 4 | 2 | no | Yes | {SAI1,SAI2} | | 4* | 1 | 1 |
| 5 | 1 | yes (no) | Yes | {SAI1,SAI2} | | 5 | 1 | 1 |
| 6 | 2 | yes (no) | Yes | {SAI1,SAI2} | | 7 | 1 | 1 |

(51) Int. Cl.
*H04W 72/00* (2009.01)
*H04W 28/16* (2009.01)
*H04W 76/40* (2018.01)

(52) U.S. Cl.
CPC ........ *H04W 72/1273* (2013.01); *H04W 28/16* (2013.01); *H04W 76/40* (2018.02)

(56) References Cited

U.S. PATENT DOCUMENTS

| | | | | |
|---|---|---|---|---|
| 2008/0019338 A1* | 1/2008 | Ishii | ............... | H04W 36/10 370/338 |
| 2008/0141097 A1* | 6/2008 | Vayanos | ........... | H03M 13/2707 714/755 |
| 2008/0151805 A1* | 6/2008 | Vayanos | ........... | H03M 13/2707 370/312 |
| 2009/0052407 A1* | 2/2009 | Motegi | ................. | H04W 28/10 370/336 |
| 2012/0263089 A1* | 10/2012 | Gupta | ................. | H04W 72/005 370/312 |
| 2013/0028118 A1* | 1/2013 | Cherian | .............. | H04W 72/005 370/252 |
| 2013/0215761 A1* | 8/2013 | Xu | ........................ | H04W 24/08 370/241 |
| 2014/0071878 A1* | 3/2014 | Xu | ........................ | H04L 12/189 370/312 |

FOREIGN PATENT DOCUMENTS

| | | |
|---|---|---|
| JP | 2012525733 A | 4/2010 |
| KR | 20110068777 | 6/2011 |
| WO | WO 2012/126210 A1 | 9/2012 |

OTHER PUBLICATIONS

Ericsson, "Considerations about ARP and UE counting", 3GPP TSG-RAN WG3 #69-bis, Xi'sn, China, Oct. 11-15, 2010, R3-102884, Oct. 11, 2010.

Ericsson, "Introduction of ARP," $3^{rd}$ Generation Partnership Project (3GPP), 3GPP TSG-RAN WG3 Meeting #70bis, R3-110331, pp. 1-27, XP050497269, Dublin, Irelena, Jan. 17-21, 2011.

New Postcom, $3^{rd}$ Generation Partnership Project (3GPP), 3GPP TSG-RAN3#70, R3-103178, pp. 1-4, XP050496428, Jacksonville (FL), USA, Nov. 15-19, 2010.

International Search Report for PCT/EP2014/055986 dated Jun. 30, 2014.

* cited by examiner

| | Session parameters | | | | | MCE determined | |
|---|---|---|---|---|---|---|---|
| Session | ARP priority level | Pre-emptable | May trigger pre-emption | MBMS SA | QoS | Message sequence number (Approach2) | Required resources in MbsfnArea1 | Required resources in MbsfnArea2 |
| 1 | 2 | Yes | Yes | {SAI1, SAI2} | | 1 | 3 | 1 |
| 2 | 1 | Yes (no) | Yes | {SAI1, SAI2} | | 2 | 2 | 1 |
| 3 | 2 | (no) Yes | Yes (no) | {SAI1, SAI2} | | 3 | 1 | 1 |
| 4 | 2 | Yes | Yes (no) | {SAI1, SAI2} | | 4 | 1 | 1 |
| 5 | 2 | Yes | Yes (no) | {SAI1, SAI2} | | 5 | 3 | 1 |

Fig. 4

| Session | Session parameters ||||| MCE determined ||
| | ARP priority level | Pre-emptable | May trigger pre-eption | MBMS SA | QoS | Message sequence number (Approach2) | Required resources in MbsfnArea1 | Required resources in MbsfnArea2 |
| --- | --- | --- | --- | --- | --- | --- | --- | --- |
| 1 | 2 | yes | No | {SAI1,SAI2} | | 1 | 3 | 1 |
| 2 | 1 | yes (no) | Yes | {SAI1,SAI2} | | 2 | 2 | 1 |
| 3 | 2 | no | Yes (no) | {SAI1,SAI2} | | 3 | 1 | 1 |
| 4 | 2 | no | Yes | {SAI1,SAI2} | | 4* | 1 | 1 |
| 5 | 1 | yes (no) | Yes | {SAI1,SAI2} | | 5 | 1 | 1 |
| 6 | 2 | yes (no) | Yes | {SAI1,SAI2} | | 7 | | |

Fig. 13

| Session | Session parameters | | | | | MCE determined | |
|---|---|---|---|---|---|---|---|
| | ARP priority level | Pre-emptable | May trigger pre-eption | MBMS SA | QoS | Message sequence number (Approach2) | Required resources in MbsfnArea1 | Required resources in MbsfnArea2 |
| 1 | 2 | yes (no) | yes | {SAI1,SAI2} | | 1 | 2 | 1 |
| 2 | 1 | yes | yes (no) | {SAI1,SAI2} | | 2 | 2 | 1 |

Fig. 22

| Operator | Session | Session parameters ||||| MCE determined ||
| | | ARP priority level | Pre-emptable | May trigger pre-eption | MBMS SA | QoS | Message sequence number (Approach2) | Required resources in MbsfnArea1 | Required resources in MbsfnArea2 |
|---|---|---|---|---|---|---|---|---|---|
| A | 1 | 2 | yes | No | {SAI1,SAI2} | | 1 | 3 | 1 |
| B | 2 | 1 | yes (no) | Yes | {SAI1,SAI2} | | 2 | 2 | 1 |
| B | 3 | 2 | no | Yes (no) | {SAI1,SAI2} | | 3 | 1 | 1 |
| A | 4 | 2 | no | Yes (no) | {SAI1,SAI2} | | 4* | 1 | 1 |

ENHANCEMENTS TO RESOURCE ALLOCATION FOR MBSFN TRANSMISSION IN AN MBSFN AREA

The present invention generally relates to mobile communication networks and systems.

Detailed descriptions of mobile communication networks and systems can be found in the literature, such as in particular in Technical Specifications published by standardization bodies such as for example 3GPP (3$^{rd}$ Generation Partnership Project).

In general, in a mobile communication system, an User Equipment UE has access to mobile services via a mobile communication network.

An example of mobile communication system is EPS (Evolved Packet System), specified by 3GPP.

An example of mobile services is MBMS (Multimedia Broadcast/Multicast Services). A description of MBMS architecture, in particular for EPS, can be found in particular in 3GPP TS 23.246. MBMS for EPS is also called eMBMS (evolved MBMS). eMBMS brings improved performance, thanks to functionalities such as in particular Single Frequency Network (SFN) mode of operation.

Two alternatives for eMBMS architecture deployment for MBSFN mode of operation, respectively called "centralized MCE architecture" and "distributed MCE architecture" are illustrated respectively in FIGS. 1 and 2 taken from 3GPP TS 36.300. A Multi-cell/multicast Coordination Entity (MCE) is a MBMS logical control entity whose functions include, in particular, the admission control and the allocation of the radio resources used by all eNBs in the MBFSN area for multi-cell MBMS transmissions using MBSFN (Multimedia Broadcast multicast service Single Frequency Network) operation, also called MBSFN transmission. A control plane interface is provided between eNB and MCE, called M2 interface, specified in particular in 3GPP TS 36.443. A control plane interface is provided between MCE and MME, called M3 interface, specified in particular in 3GPP TS 36.444.

MBSFN mode of operation brings many benefits, in particular an increased network capacity. MBSFN however still needs to be improved in some aspects, as recognized by the inventors and as will be described with more detail. In particular, there is a need for more consistent radio resources allocation across MCEs, especially (though not exclusively) in a distributed MCE architecture. More generally, there is a need to improve support of MBMS in such systems (such as EPS) and/or MBMS bearer services provided by such systems.

Embodiments of the present invention in particular address such needs.

These and other objects are achieved, in one aspect, by a method for resource allocation to MBMS services for MBSFN transmission in an MBSFN Area in a mobile communication system, said resource allocation including an assessment of a list of MBMS sessions to be scheduled for said MBSFN transmission, a method wherein a Sequence Number SN is used for said assessment, said SN determining the rank of an MBMS session in a sequence of MBMS sessions scheduled by one or more BM-SC(s) for said MBMS services, said rank of said MBMS session in said sequence being used in said assessment to determine a rank of said MBMS session in said list.

These and other objects are achieved, in another aspect, by a method for resource allocation to MBMS services for MBSFN transmission in an MBSFN Area in a mobile communication system, said resource allocation including an assessment of a list of MBMS sessions to be scheduled for said MBSFN transmission, said method including performing a re-assessment of said list of MBMS sessions at any one of a Session Start, a Session Update, a Session Stop or an MBSFN Area re-configuration, as if starting from scratch a sequence of MBMS Session Start requests was received requesting the starting of MBMS sessions.

These and other objects are achieved, in another aspect, by a method for resource allocation for MBSFN transmission in an MBSFN Area for MBMS service in a mobile communication system, a method wherein, in the absence of sufficient resources to serve a new MBMS Session Start Request at the time this request is received, this new MBMS session is admitted but marked as suspended, i.e. not broadcast over radio until adequate resources become available.

These and other objects are achieved, in other aspects, by various functional entities of a mobile communication system, configured to carry out such method(s), said entities including, in particular (though not exclusively), Multi-cell/multicast Coordination Entity (MCE), MME or S4-SGSN, MBMS-GW, BM-SC, Sequence Number allocation server.

Some embodiments of apparatus and/or methods in accordance with embodiments of the present invention are now described, by way of example only, and with reference to the accompanying drawings, in which:

FIGS. 3 to 29 are intended to illustrate different embodiments and/or aspects of the present invention, to simplify based on examples.

Figure 1:
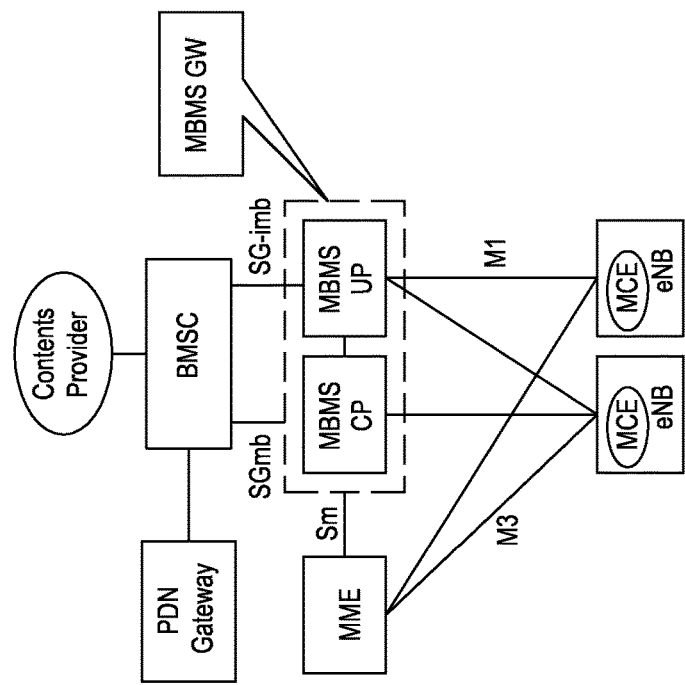
FIG. 1 is intended to recall two example of architectures for MBMS in EPS.
Figure 1:
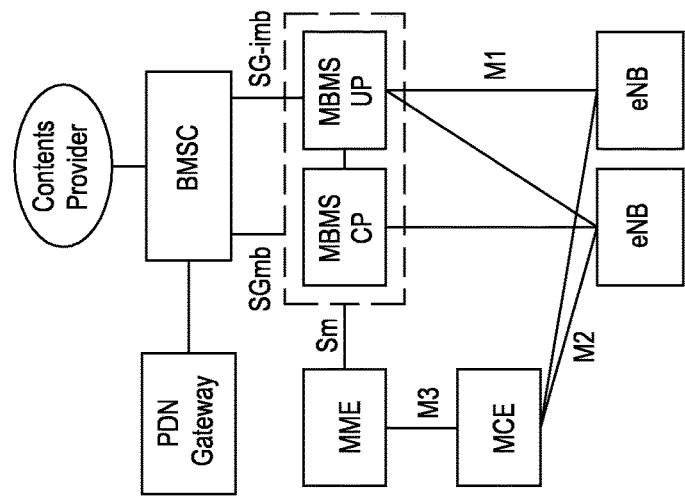

Various embodiments and/or aspects of the present invention will be more detailed in the following, by way of example for MBMS in EPS. However it should be understood that the present invention is not limited to EPS, and could apply as well to support of multimedia broadcast/multicast services in 3GPP systems other than EPS or in systems specified by standardization bodies other than 3GPP.

Embodiments of the present invention will be more detailed in the following, by way of example for the case of a distributed MCE architecture. However it should be understood that the present invention is not limited to such architecture.

Embodiments of the present invention enable to solve problems which can be presented as follows, to simplify based on an example.

3GPP CT4 and RAN3 are specifying in 3GPP Release 12 enhanced restoration procedures to restore the MBMS service when failures/resets happen to an MME, S4-SGSN, MCE, MBMS-GW or BM-SC or to their corresponding links, in order to minimize the end-user service impact.

The main principle of these enhanced restoration procedures is that the first upstream node to the interface or node that experiences a failure or a restart, e.g. the MME for an M3AP path failure or an eNB restart, re-creates all the active MBMS sessions in the node affected by the failure. E.g. upon an eNB restart, each MME with an M3AP interface with this eNB will initiate an MBMS session start procedure towards the eNB to re-create all MBMS sessions.

All eNBs pertaining to the same MBSFN area (see 3GPP TS 23.246) shall schedule the same MBMS sessions, with the same radio resources, in order to allow UEs to receive MBMS session(s)s continuously & consistently when it moves within the MBSFN Area.

This shall also be true when the MBMS sessions are re-created as part of these enhanced restoration procedures, e.g. the restarted eNB shall schedule the same MBMS sessions with the same radio resources as done in the other (non restarted) eNBs of the MBSFN Area.

However no procedure has been standardized to enable to ensure a consistent allocation of resources for MBMS sessions in an MBSFN area. This might lead eNBs of a same MBSFN Area to schedule different MBMS sessions or the same sessions with different radio resources, breaking the concept of an MBSFN area or preventing these restoration procedures to take place.

This is particularly critical for the distributed MCE architecture, where an MCE is collocated with each eNB. But the problem can also exist with centralised MCEs if the same MBSFN area is served by multiple MCEs (e.g. with overlapping MBSFN areas to ensure service continuity).

It is also necessary to end up with a consistent allocation of resources for MBMS sessions in an MBSFN area in various other use cases, e.g.
  when the MCEs serving the MBSFN area do not receive the MBMS session start/session update/session stop request messages in the same order;
  when there is insufficient radio resources for MBMS services and a new session with a higher QoS i.e. higher priority ARP (Allocation and Retention Priority) needs to pre-empt an on-going MBMS session with a lower priority ARP;
  when the operator modifies the configuration of the MBSFN area, e.g. increase or decrease the set of radio resources available for MBMS.

Example of problem: Let's consider the following set of MBMS sessions.

| Session | ARP | Pre-emptable | May trigger pre-emption | Resource |
| --- | --- | --- | --- | --- |
| 1 | 2 | Yes | No | 3 |
| 2 | 1 | yes (no) | Yes | 2 |
| 3 | 2 | No | Yes (no) | 1 |
| 4 | 2 | No | Yes (no) | 1 |

And assume that the MCE(s) controlling the MBSFN area can accommodate 4 resources for MBMS.

And assume that all sessions are to be started in the same MBSFN area

The following sessions are initiated in sequence:
Start session 1 (started in MCE)
Start session 2 (pre-empts session 1)
Start session 3 (started in MCE)
Start session 4 (started in MCE)
Stop session 2 (stopped in MCE)
At the end of the sequence:
Sessions 3, 4 are active in MCE(s).
MME knows that sessions 1, 3 and 4 are running.
An MCE failure/restart happens. The MCE will send a RESET or M3 SETUP REQUEST message to the MME (see 3GPP TS 36.444). The MME Starts the sessions in the same order as before (that is session 1, session 3 and last session 4)
Resulting sessions in the restarted MCE:
Start session 1 (started in MCE)
Start session 3 (started in MCE)
Start session 4 (rejected by MCE)
At the end of the sequence:
Sessions 1 and 3 are running in MCE,
MME also believes that session 1 and 3 are running.
Before reset: Sessions 3 and 4 were running
After reset: Sessions 1 and 3 are running
Different MBMS sessions are running in different MCE(s) controlling the same MBSFN area !
No standard solution exists to ensure consistent allocation of resources for MBMS sessions in MSFN areas in all cases.

Proprietary MCE(s) logics may be implemented by each vendor. Since different vendor's MCEs are likely to implement different algorithms, operators cannot deploy MCEs from different vendors in a same MBSFN area.

Principles

Figure 18:
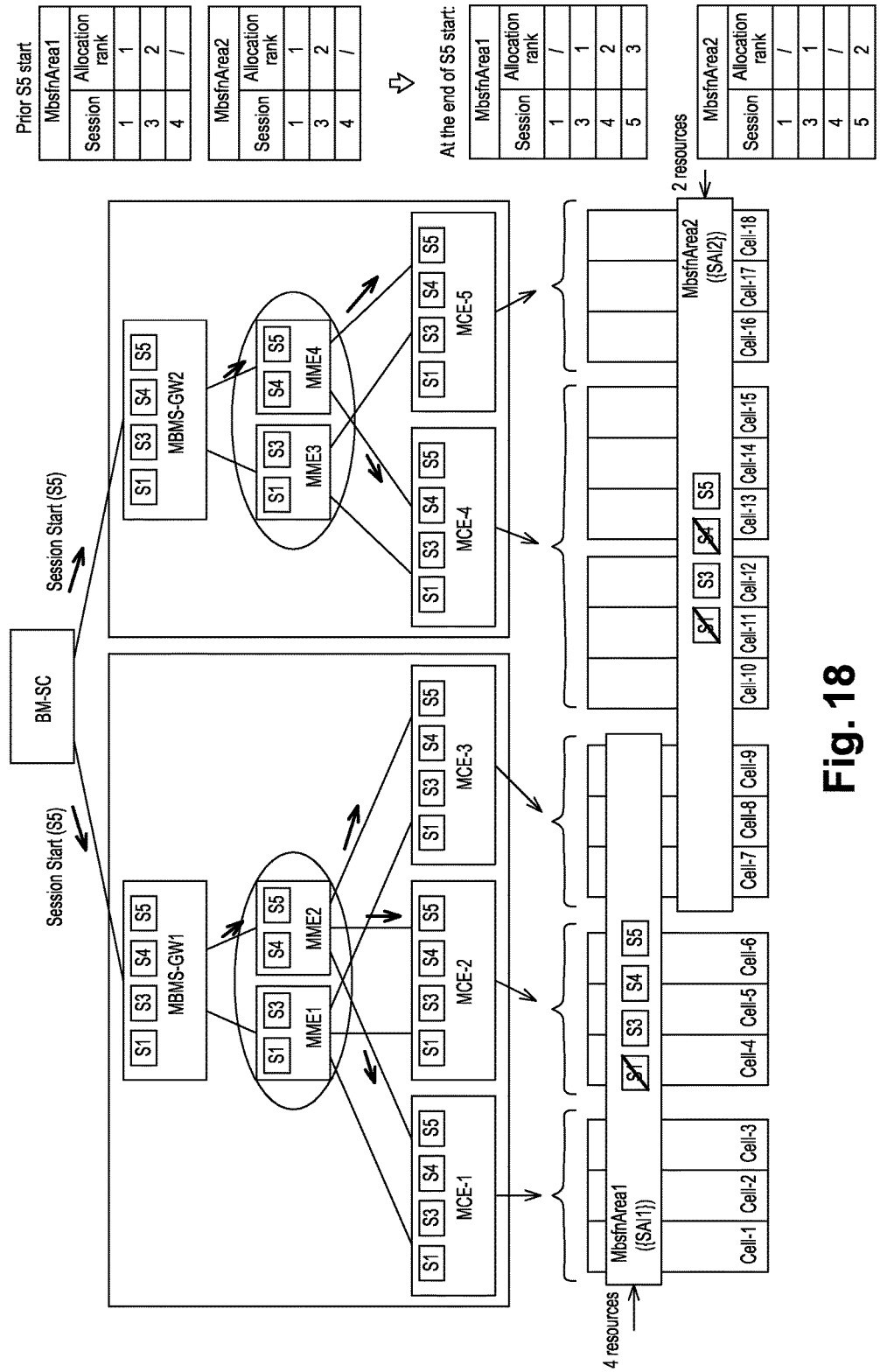

Embodiments and/or aspects of the present invention rely on one or more of the following principles:
  [REQ1] All the MCEs of the MBSFN area shall re-assess at every session start, update, stop or Mbsfn Area reconfiguration the list of MBMS sessions to be scheduled.
  [REQ2] All the MCEs of the MBSFN area shall use deterministic criteria to always end up with a consistent (i.e. identical) selection of MBMS sessions and a consistent allocation of radio resources for these sessions, and this independently of the past sequence of events (session starts, session stops, session preemptions, . . . ).
This is further described as the "replay operation".
  [REQ3] Replay operation: The Session Sequence Number (SN) of each session is used by the MCE during replay operations to ensure a deterministic behavior, i.e. the MCE re-assesses the sessions to schedule as if (starting from scratch) it received a sequence of MBMS session start requests starting from the session with the lowest sequence number and up to the session with the highest sequence number (the ARP-PL does not affect the sequencing of the sessions replay). Replays will happen whenever there's a session being added, updated, removed in an MbsfnArea following e.g. an Mbsfn Area reconfiguration, an M3 session start request, an M3 session stop request. During replay operations the ARP-PL and ARP pre-emption vulnerability and capability indicators are used as if a new sequence of session start would happen. If the replay operation requires to pre-empt session(s) with a lower priority ARP-PL, the (pre-emptable) session with the lowest priority ARP-PL, and with the highest session sequence number for sessions with the same lowest priority ARP-PL, shall be pre-empted first—this principle is illustrated in FIG. 18.

As a consequence of the principles above, the session sequence number is used in the determination of the session allocation rank of sessions admitted in MbsfnAreas. [REQ4] Session sequence number: if the session sequence number is not received in an MBMS Session Start/Update request over the M3 interlace (case e.g. of a legacy MME(s) or BM-SC(s) or MBMS-GW(s) or not planned to deploy a server of Session SN), the MCE shall derive a SN from a same set of common rules (across MCEs) e.g. from the tuple (M3 absolute time, TMGI-serviceIdentity, TMGI-PLMN-ID), where
  'M3 absolute time' is used as $1^{st}$ criterion for SN determination
  TMGI-serviceIdentity is used as $2^{nd}$ criterion for SN determination (useful only if there are several sessions with the same 'M3 absolute time', i.e. if sessions are to be started at same time)
  TMGI-PLMN-ID is used as $3^{rd}$ criterion for SN determination (useful only if there are several session with the same 'M3 absolute time' & same TMGI-serviceIdentity—this last criterion is useful for e.g. MOCN deployments cases where the MbsfnAreas are shared between several operators)

In other words, the invention works also fine using an implicit Session Sequence Number derived from MCE(s) from existing parameters if a new explicit Session Sequence Number is not provided on the interfaces from the BM-SC to the MCE(s).

Figure 2:
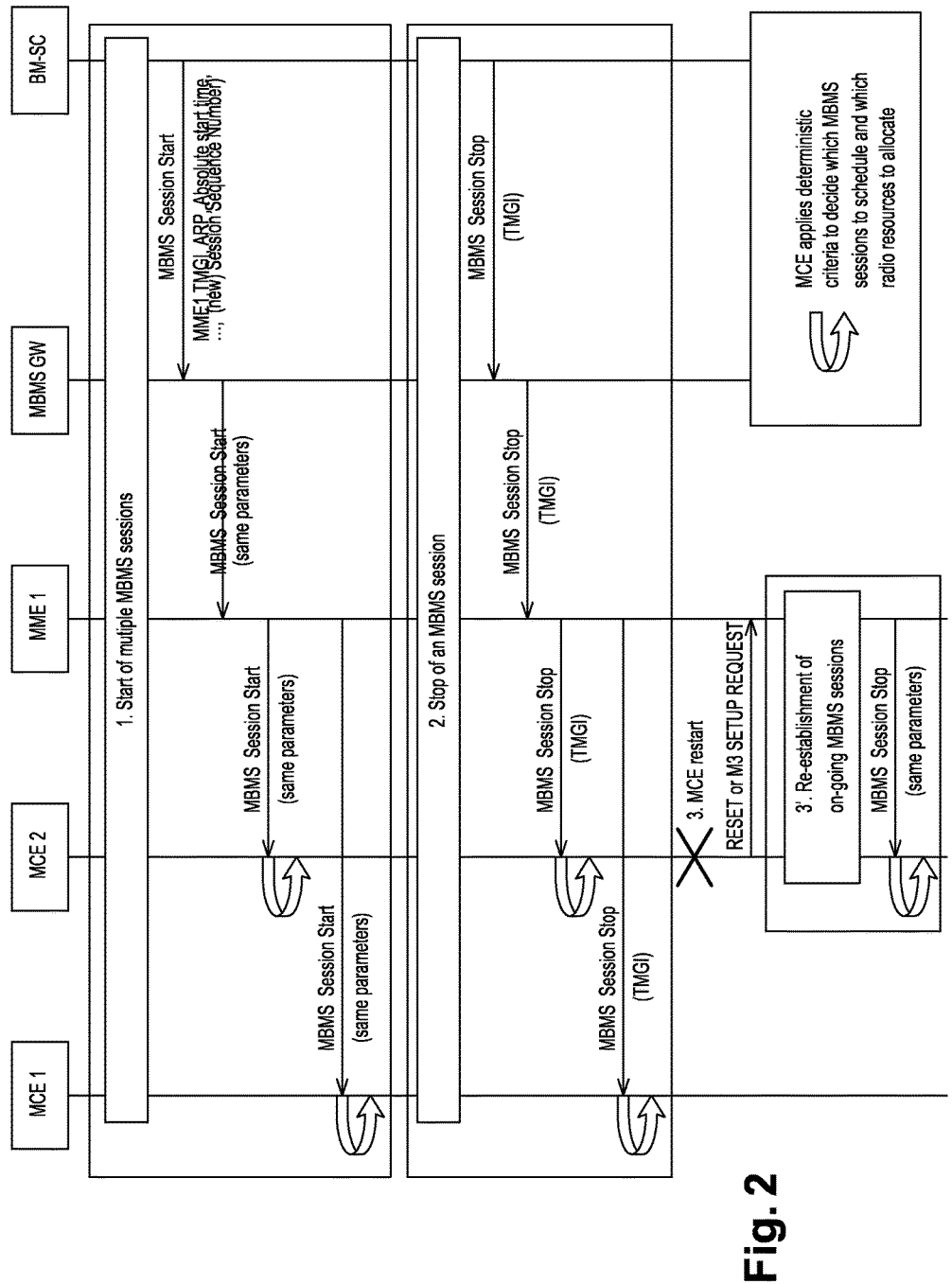
FIG. 2 is intended to provide an example of embodiment of the present invention using a new Session Sequence Number over the various interfaces of the system.

[REQ5] In case the session sequence number is provided over M3 interface (an example for providing the sequence number over the various interfaces of the system being illustrated in FIG. 2), the MCE shall then rely on this information. A session sequence number is generated on BM-SC request whenever there's a need to start an MBMS session; a new session sequence number may optionally be generated on BM-SC request when there's a need to update an MBMS session, otherwise the old session sequence number is reused in MBMS session update request (in order to always ensure fairness between different individual sessions a new session sequence number should be used in case the update has potentially an impact on MbsfnArea resource allocation); the sequence number is then signaled by the BM-SC towards the MCE(s) in the MBMS session start as well as in MBMS session update messages (e.g. for use towards new MCE(s) if the service area is extended).

Figure 3:
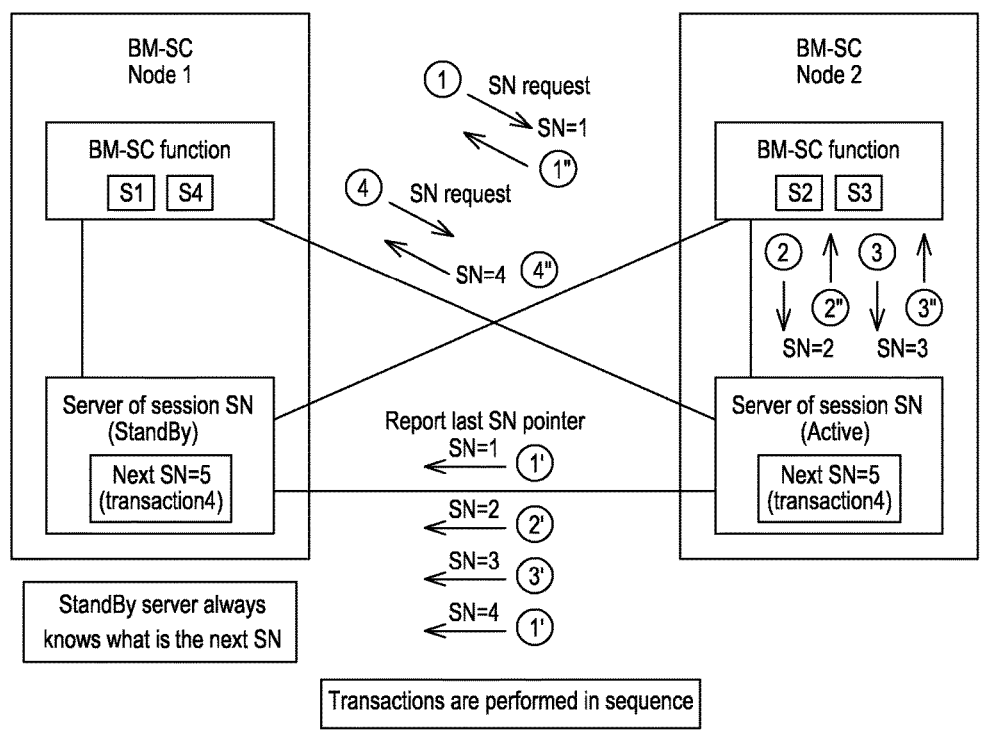

[REQ6] The server of session sequence number is a functional entity that may be hosted by the BM-SC. If there's only one BM-SC in use there's no need for geo-redundant server of session SN. If there are several BM-SC(s) in use for a same geographical area (e.g. geo-redundancy or Network sharing) then the server of session SN should be geo-redundant in e.g. Active/Standby mode each instance of server of session SN being hosted by one BM-SC. An example of implementation of allocation of sequence number is depicted in FIG. 3.

Note 1: Alternatively, 1 bit (or more) in the SN could be reserved to ensure that SNs assigned by different servers do not overlap. With such an approach, the last SN assigned by one server would not need to be synchronized towards the standby server. This approach would suffice e.g. in deployments where the failure of a BM-SC would anyway lead to tear down all existing MBMS sessions. This approach would also suffice in some network sharing cases, e.g. when each Mbsfn Synchro Area is dedicated to one operator (e.g. MORAN case), in MOCN case when each Mbsfn Area is dedicated to one operator (none of the configured Mbsfn Areas is shared between several operators).

[REQ7] Besides, to ensure that all the MCEs of the Mbsfn Area always end up with a consistent (i.e. identical) selection of MBMS sessions and a consistent allocation of radio resources for these sessions, an MCE shall accept new MBMS sessions even in absence of sufficient resources to serve the new MBMS Session Start Request at the time this request is received; the new MBMS session is marked as 'suspended' i.e. not broadcast over the radio until adequate radio resources become available (e.g. when another active session is stopped, e.g. when the resources available for MBMS increase in the Mbsfn Area outside of busy hour periods).

Note 2: this is a change compared to existing 3GPP standards that require the MCE to return an MBMS Session Start Failure if no available resources are available in the MCE to serve a new MBMS session. This behavior however prevents the new session to be scheduled when available resources become free and can also lead to desynchronized MBMS contents throughput the Mbsfn Area with some MCEs accepting the new session and others not (depending on their past sequence of events). The problem is illustrated in FIGS. 10 to 13. The operator is aware via alarms generated by the MCE(s) that some MBMS sessions are suspended due to radio resources shortage, and thus may decide to stop MBMS sessions in excess.

Examples to Illustrate these Principles

First Set of Examples

FIG. 4 illustrates an example of session and associated parameters considered for this first set of examples.

Extract from 3GPP TS 36.444 v11.4.0: ARP priority values 1 to 14 are ordered in decreasing order of priority, i.e. 1 is the highest and 14 the lowest.

Note 1: an MBMS session may require different radio resources in different MBSFN areas depending on the MCS (Modulation & Coding Scheme) used in each MBSFN area (e.g. if the signal over noise ratio differs in different MBFSN areas).

Initial conditions: 4 radio resources are available for MBMS services in each MCE and for each Mbsfn Area.

Figure 5:
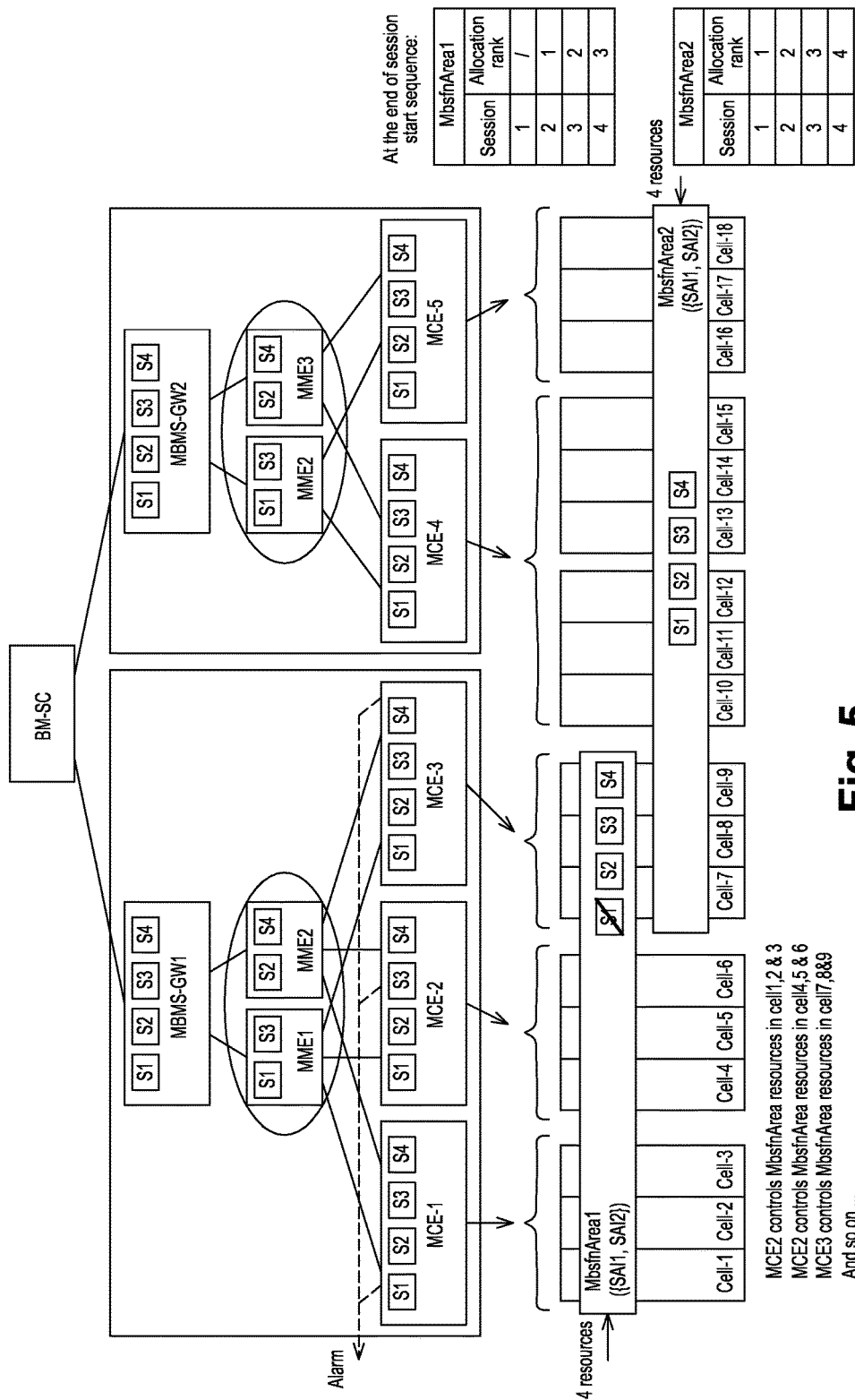

1/ First Example of First Set (FIG. 5)

The following sessions are initiated in sequence:

Start session 1 (started in MCEs, active in MbsfnArea1 & 2)

Start session 2

Not enough resources to accommodate S2 in MbsfnArea1=>S2 pre-empts S1
  S2 active in MbsfnArea1 & 2
  S1 active in MbsfnArea2

Start session 3 (started in MCEs, active in MbsfnArea1 & 2)

Start session 4 (started in MCEs, active in MbsfnArea1 & 2)

At the end of the sequence:

Sessions 2, 3, 4 are active in MbsfnArea1 (not enough resources to accommodate all sessions)

All sessions are active in MbsfnArea2 (enough resources to accommodate all sessions)

MMEs know that sessions 1, 2, 3 and 4 are running.

The RAN operator is informed that there are not enough resources in MbsfnArea 1

Note 2: an MBMS session may be broadcast in overlapping MBSFN areas for seamless service continuity when the user moves across different MBSFN areas. E.g. the same MBMS session is scheduled twice in the cells served by the MCE-3 in the example above.

Figure 6:
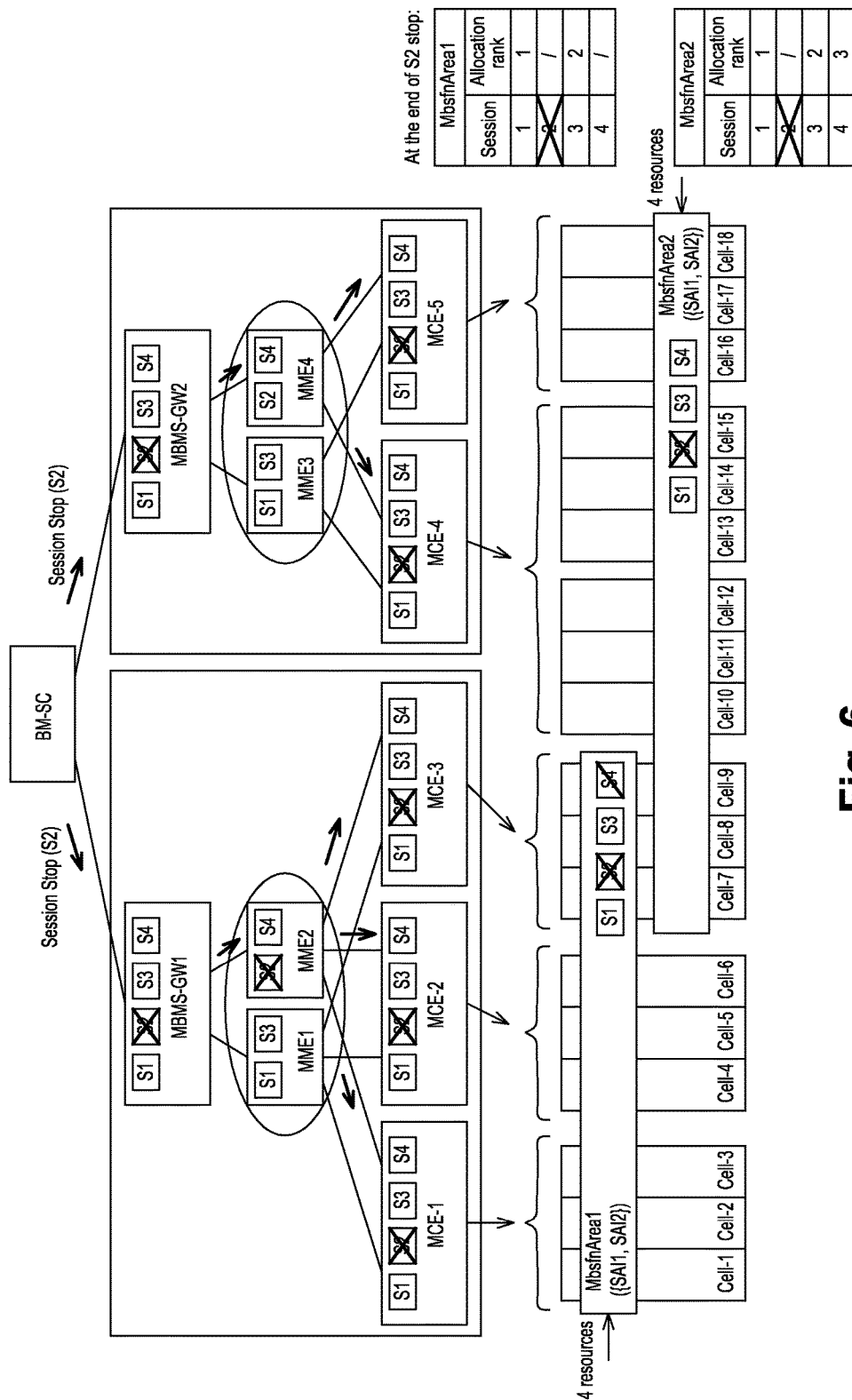

2/ Second Example of First Set (FIG. 6)

Session S2 Stopped

At the time the session 2 is stopped, the MCE re-assesses the allocation according to the ARP criteria (neutral criteria in this example since the ARP of all the remaining sessions is the same) and according to the session sequence number.

In MbsfnArea1: the session 1 is admitted again (sequence number=1), the session 3 is admitted too (sequence number=3 & sequence number 2 has disappeared—should not be reallocated by the server for a given period), the session 4 is not admitted (sequence number=4 & no more available resource)

In MbsfnArea2: allocation for sessions 1, 3 & 4 are re-calculated again

At the end of S2 stop:

Sessions 1, 3 are active in MbsfnArea1 (not enough resources to accommodate S4)

Sessions 1, 3 & 4 are active in MbsfnArea2 (enough resources to accommodate all sessions)

MMEs know that sessions 1, 3 and 4 are running.

The RAN operator is still informed that there is not enough resources in MbsfnArea 1

Figure 7:
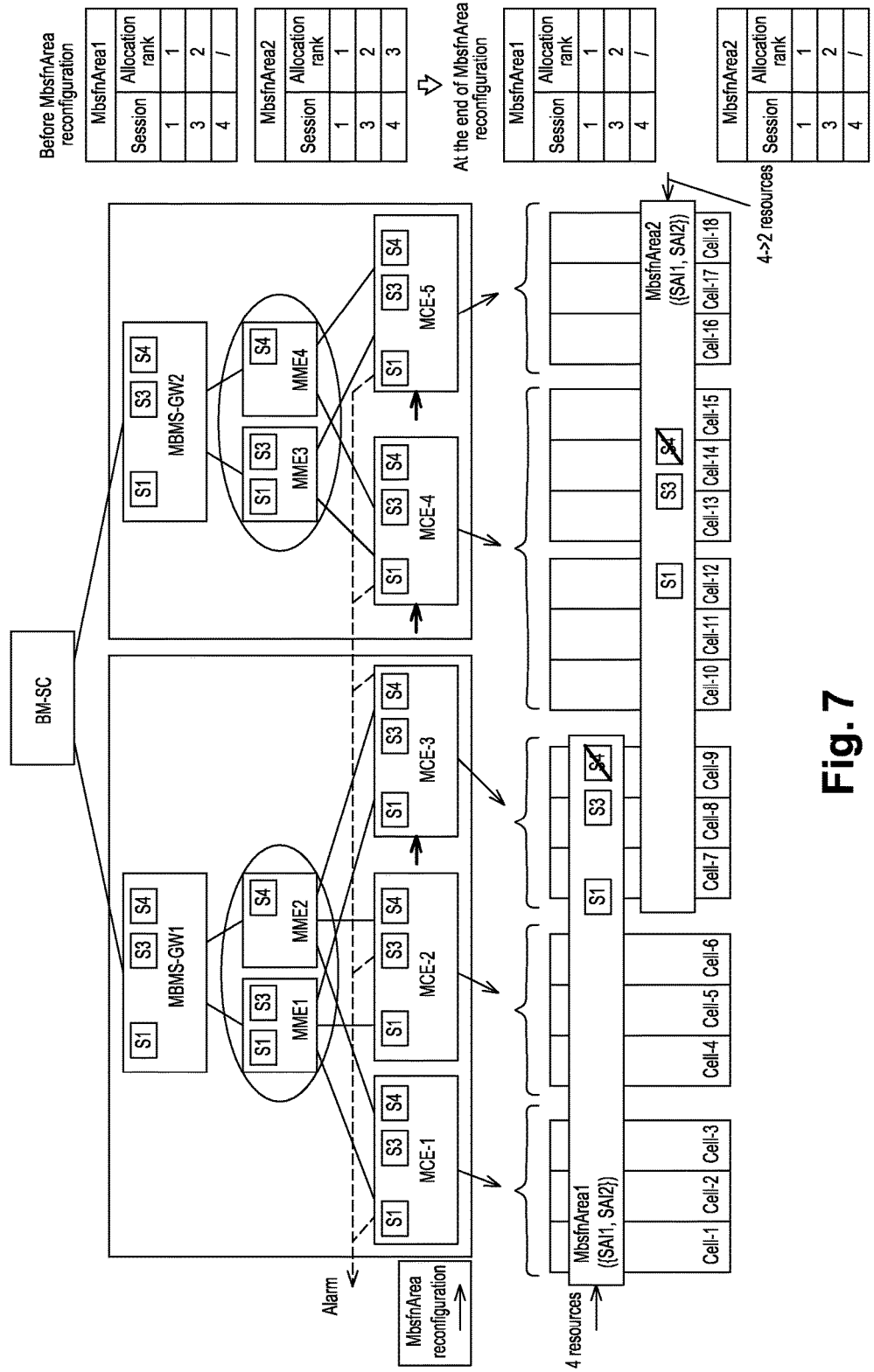

3/ Third Example of First Set (FIG. 7)

The Operator Reduces the Amount of Allowed Resources to 2 Resources in MbsfnArea2

Each MCE re-assesses the allocation according to the ARP criteria (neutral criteria in this example since the ARP of all the remaining sessions is the same) and according to the session sequence number.

In MbsfnArea2: the session 1 is admitted again (sequence number=1), the session 3 is admitted too (sequence number=3 & sequence number 2 has disappeared), the session 4 is no more admitted (sequence number=4 & no more available resource)

In MbsfnArea1: no impact on sessions

At the end of reconfiguration of MbsfnArea2:

Sessions 1, 3 are active in MbsfnArea1 & 2 (not enough resources to accommodate S4)

MMEs see that sessions 1, 3 and 4 are running.

The RAN operator is informed that there is not enough resources in MbsfnArea 2 in addition to MbsfnArea 1

Figure 8:
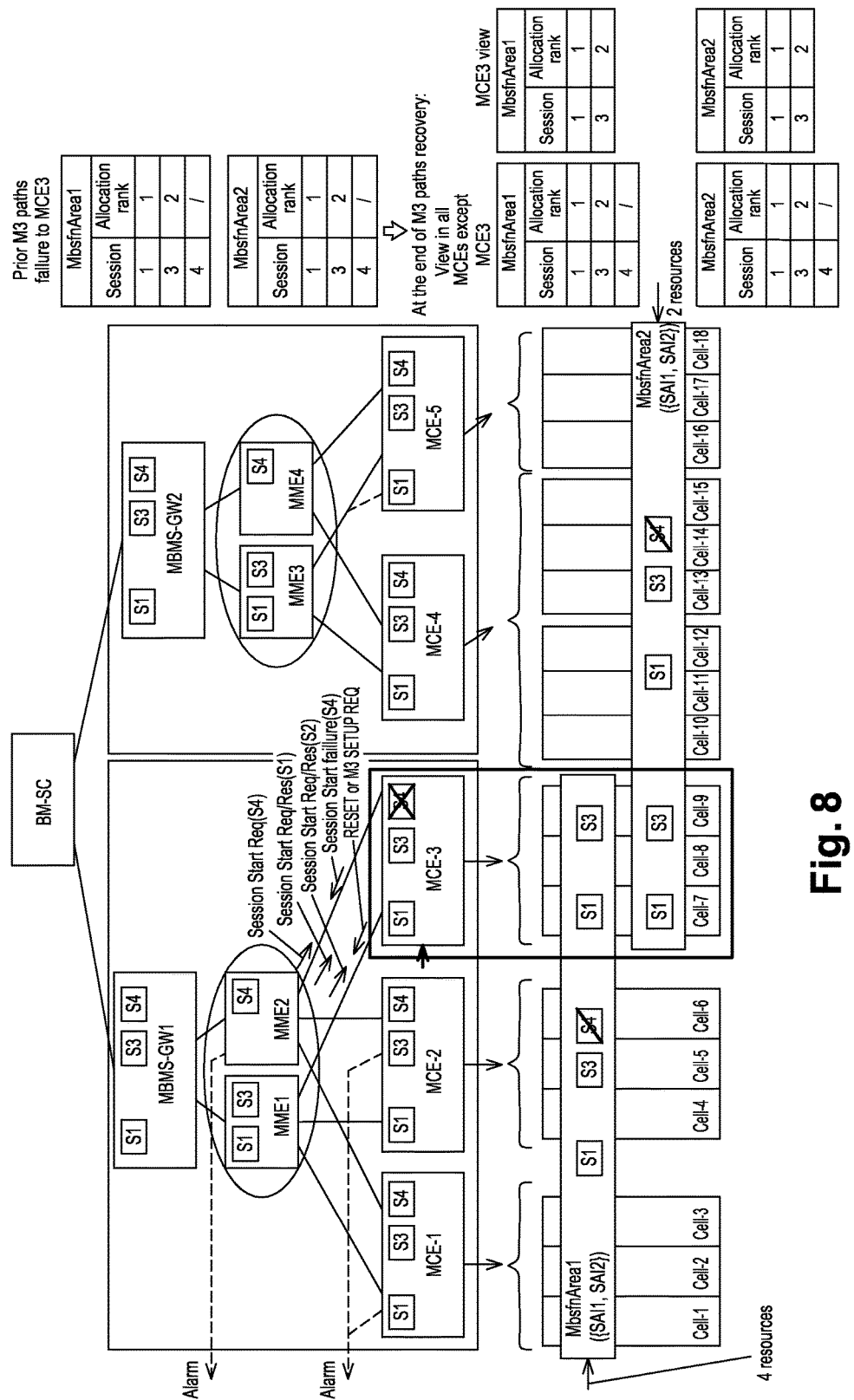

Note: In order to synchronize the MbsfnArea configuration update over radio interface (in all cells serving the MbsfnArea) resulting from MbsfnArea reconfiguration O&M operation, the MbsfnArea O&M command MAY include the absolute time (e.g. UTC time) at which the online modification should apply in cells 4/ Fourth Example of First Set (FIG. 8)

MCE3 Needs to be Restarted Following a Maintenance Operation

MME 1 & 2 detect the loss of M3 path to MCE3 and relesase the associated M3AP ID resources The MCE restarts, The MCE will send a RESET or M3 SETUP REQUEST message to MME1 & MME2. The MME1 Starts the sessions in the same order as before (that is S1, S3). The MME2 starts the session4. MCE re-assesses the allocation according to the ARP and the session sequence number.

In MbsfnArea1&2: S1 is admitted again (sequence number=1), S3 is admitted too (sequence number=3 & sequence number 2 has disappeared), S4 is still not admitted (sequence number=4 & no more available resource)

At the end of MCE3 start:

Sessions 1, 3 are active in MbsfnArea1 & 2 (not enough resources to accommodate S4)

MME1 sees that sessions 1 and 3 are running. MME2 is informed that session 4 couldn't be started The RAN operator is informed that there are not enough resources in MbsfnArea 1 & 2

The Core Network operator is informed that a session has been rejected in MBMS SA {SAI1, SAI2}

Extract from 3GPP TS 36.444:

If the MCE determines that the E-UTRAN is not able to accommodate the requested configuration for any MBSFN area of the requested service area (e.g. the necessary MBMS resources for the MBMS Session could not be established in any MBSFN area of the requested service area), the MME shall be informed by the MBMS SESSION START FAILURE message including a suitable cause value.

Three session start result cases:

1/ session start full success=>MCE answer to MME=MBMS Session Start Response (S1 & S3 in MCE-3 in this example)

2/ session start partial success (session admitted in at least one MBSFN area & session not admitted in at least one MBSFN area)=>MCE answer to MME=MBMS Session Start Response 3/ session start failure=>MCE answer to MME=MBMS Session Start Failure (S4 in MCE-3 in this example)

Note 3: the MME keeps the MBMS bearer context even for sessions for which an MCE returns an MBMS Session Start Failure. The 3GPP standards allow an MME, as an option, not do so if all the MCE(s) to which an MBMS Session Start request has been sent have returned an MBMS Session Start Failure.

Extract from 3GPP TS 23.246 section 8.3.2: The MME may return an MBMS Session Start Response to the MBMS-GW as soon as the session request is accepted by one E-UTRAN node.

Note 4: the MCE3 broadcasts the sessions S1 and S3 at the end of this scenario, regardless of the order of the MBMS Start request it receives for the sessions S1, S3 and S4 (since the MCE re-assesses the sessions to schedule at each request according to the ARP and the session sequence number). If the request for the session S4 arrives before the request(s) for the session(s) S1 or/and S3, the session S4 is accepted and then pre-empted by sessions S1 and S3. In this latter scenario, the session 4 is known (and in the pre-empted state) in the MCE-3.

Note 5: the session S4 is rejected by the MCE-3 in this example only to illustrate the problem of doing so. Based upon the principle [REQ7] described in clause 1, MCE-3 would accept this session but in a 'suspended' state—and thus would end up with the exact same view as the other MCEs of the same Mbsfn Area. And thus none of the issues discussed below in the rest of this example set 1 occurs with the principle [REQ7].

Figure 9:
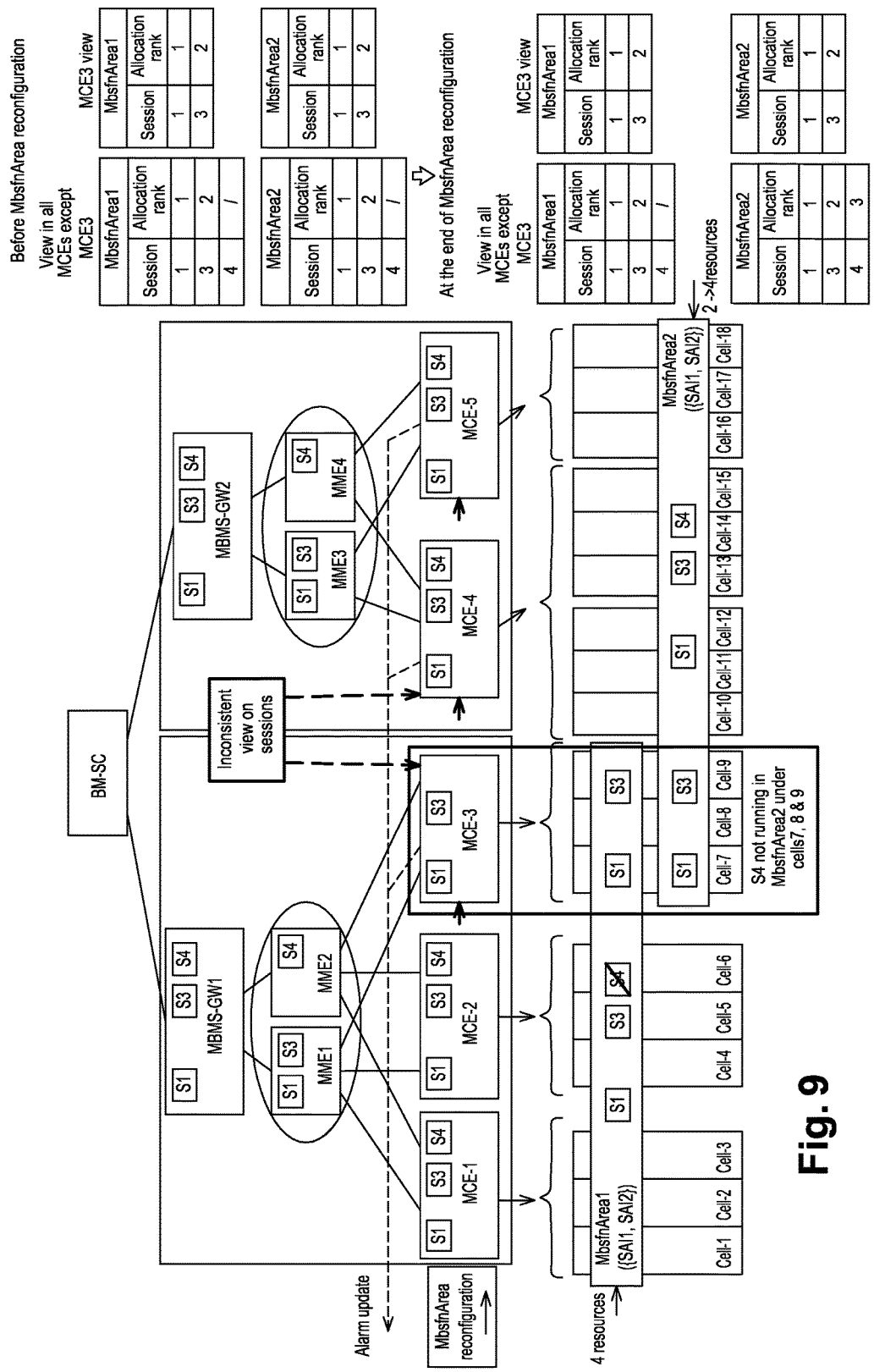

5/ Fifth Example of First Set (FIG. 9)

The Operator Increases the Amount of Allowed Resources to 4 Resources in MbsfnArea2

Each MCE re-assesses the allocation according to the ARP criteria (neutral criteria in this example since the ARP of all the remaining sessions is the same) and according to the session sequence number.

In MbsfnArea2: the session 1 is admitted again (sequence number=1), the session 3 is admitted too (sequence number=3 & sequence number 2 has disappeared), the session 4 is admitted again (sequence number=4 & available resource)

In MbsfnArea1: no impact on sessions

At the end of reconfiguration of MbsfnArea2:

Sessions 1, 3 are active in MbsfnArea1 (not enough resources to accommodate S4)

Sessions 1, 3 & 4 are active in MbsfnArea2

MME 1 & 3 see that sessions 1, 3 are running

MME 4 sees that session 4 is running

MME 2 sees that session 4 is inactive

The RAN operator is informed that there is enough resources in MbsfnArea 2 but not enough in MbsfnArea 1

Solution 1 to cope with the issue (auto-correction):

1/ following a MbsfnArea reconfiguration, the MCE should initiate an M3 Reset (All) on each M3AP path in order to solicit the connected MMEs to provide again the list of sessions and each receiving MCE to replay again all session starts 2/ upon reception of an M3 session start request, the MCE checks whether the session is already known
- if already known, the MCE only updates its session context with the new MME M3AP ID and answers with M3 session start response including the new MME M3AP ID and the unchanged MCE M3AP ID
- if unknown, the MCE performs all necessary actions associated to a new session start.

Figure 10:
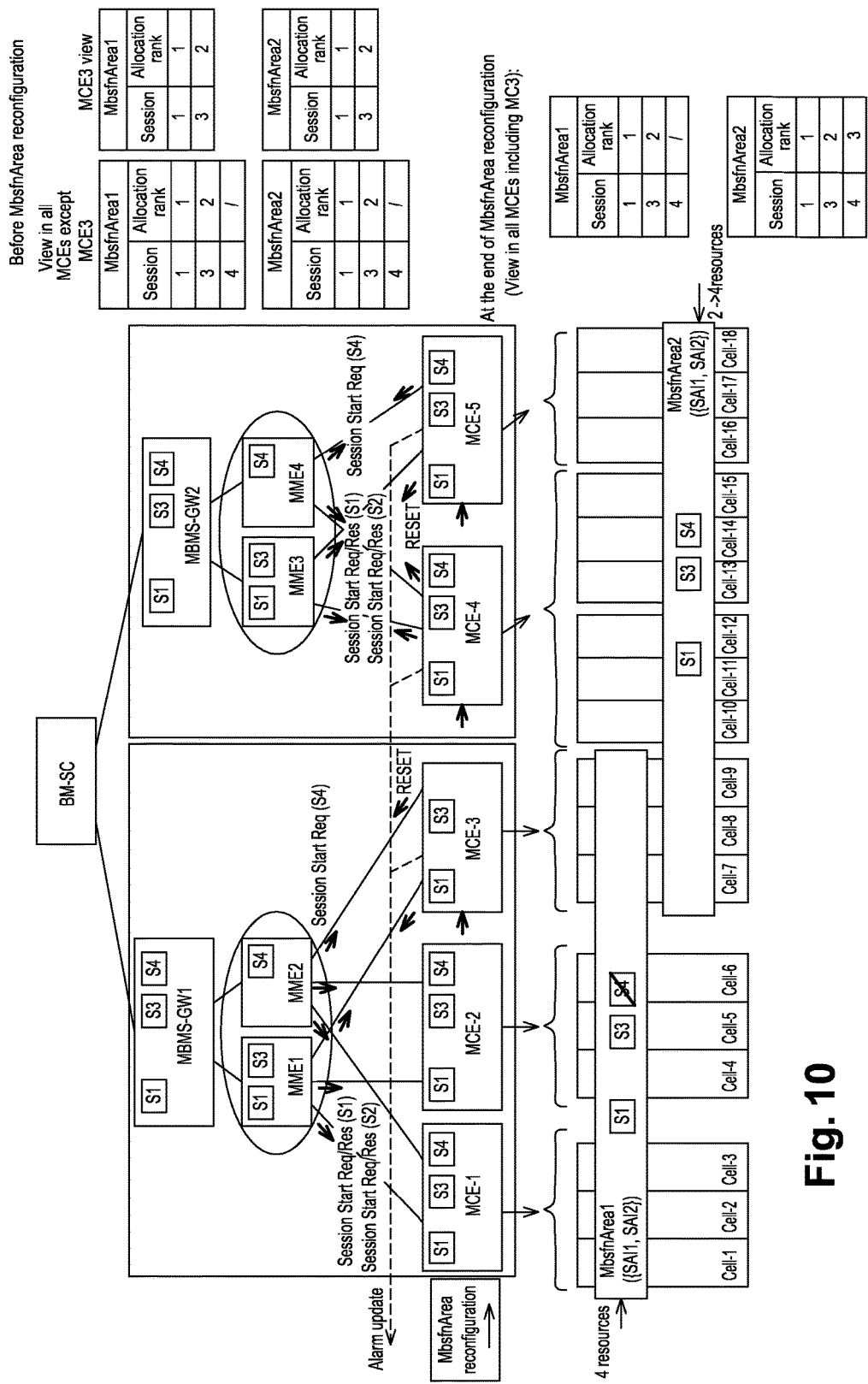

This gives the following outcome with the above solution 1:

5'/Sixth Example of First Set (FIG. 10)

The Operator Increases the Amount of Allowed Resources to 4 Resources in MbsfnArea2

Each MCE initiates a M3 Reset (all)

After an M3 Reset completion, the MME issues one MBMS Session Start Request per still active session Upon reception of an M3 session start request the MCE checks whether the session is already known
- if already known, the MCE only updates its session context with the new MME M3AP ID and answers with M3 session start response including the new MME M3AP ID and the unchanged MCE M3AP ID
- if unknown, the MCE performs all necessary actions associated to a new session start.

The MCE re-assesses the allocation according to the ARP criteria (neutral criteria in this example since the ARP of all the remaining sessions is the same) and according to the session sequence number.

In MbsfnArea2: the session 1 is admitted again (sequence number=1), the session 3 is admitted too (sequence number=3 & sequence number 2 has disappeared), the session 4 is admitted again (sequence number=4 & available resource)

In MbsfnArea1: no impact on sessions

At the end of reconfiguration of MbsfnArea2:
- Sessions 1, 3 are active in MbsfnArea1 (not enough resources to accommodate S4)
- Sessions 1, 3 & 4 are active in MbsfnArea2
- MME 1 & 3 see that sessions 1, 3 are running
- MME 2 & 4 see that session 4 is running
- The RAN operator is informed that there is enough resources in MbsfnArea 2 but not enough in MbsfnArea 1

Figure 11:
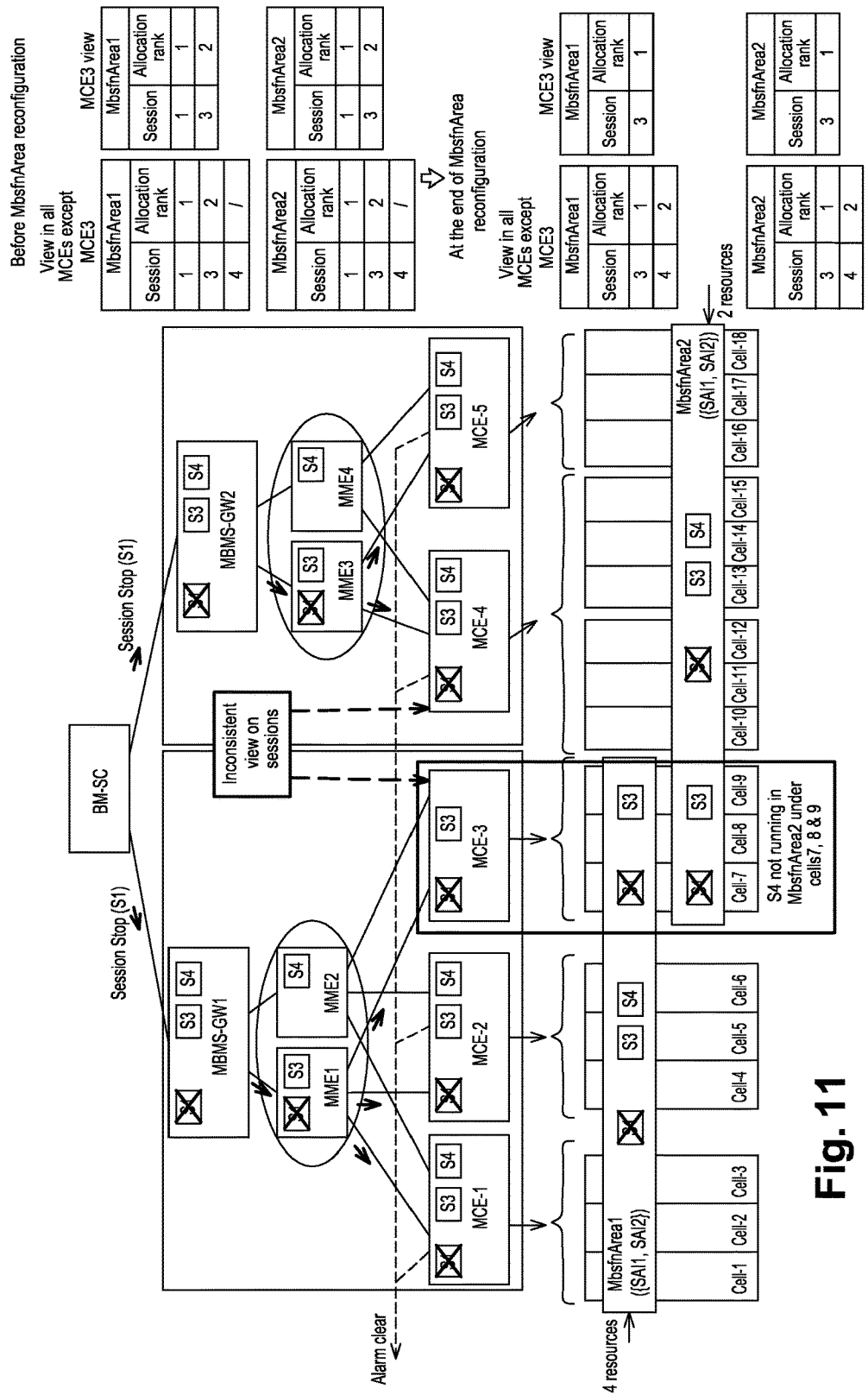

5"/ Seventh Example of First Set (FIG. 11)

Session S1 Stopped

At the time the session S1 is stopped, the MCE re-assesses the allocation according to the ARP criteria (neutral criteria in this example since the ARP of all the remaining sessions is the same) and according to the session sequence number.

In Mbsfn Areas 1&2 controlled by all MCEs except MCE3: the session 3 is re-admitted first (sequence number=3 & sequence number 1&2 have disappeared—should not be reallocated by the server for a given period), then session 4 is admitted (sequence number=4 & now enough available resource)

In Mbsfn Areas 1&2 controlled by MCE3: allocation for session 1 is calculated again At the end of S1 stop:
- Session 4 is active in all Cells except these controlled by MCE3
- Session 3 is active in all Cells
- MMEs know that sessions 3 and 4 are running.
- The RAN operator is informed that there are enough resources in Mbsfn Areas 1 &2

Figure 12:
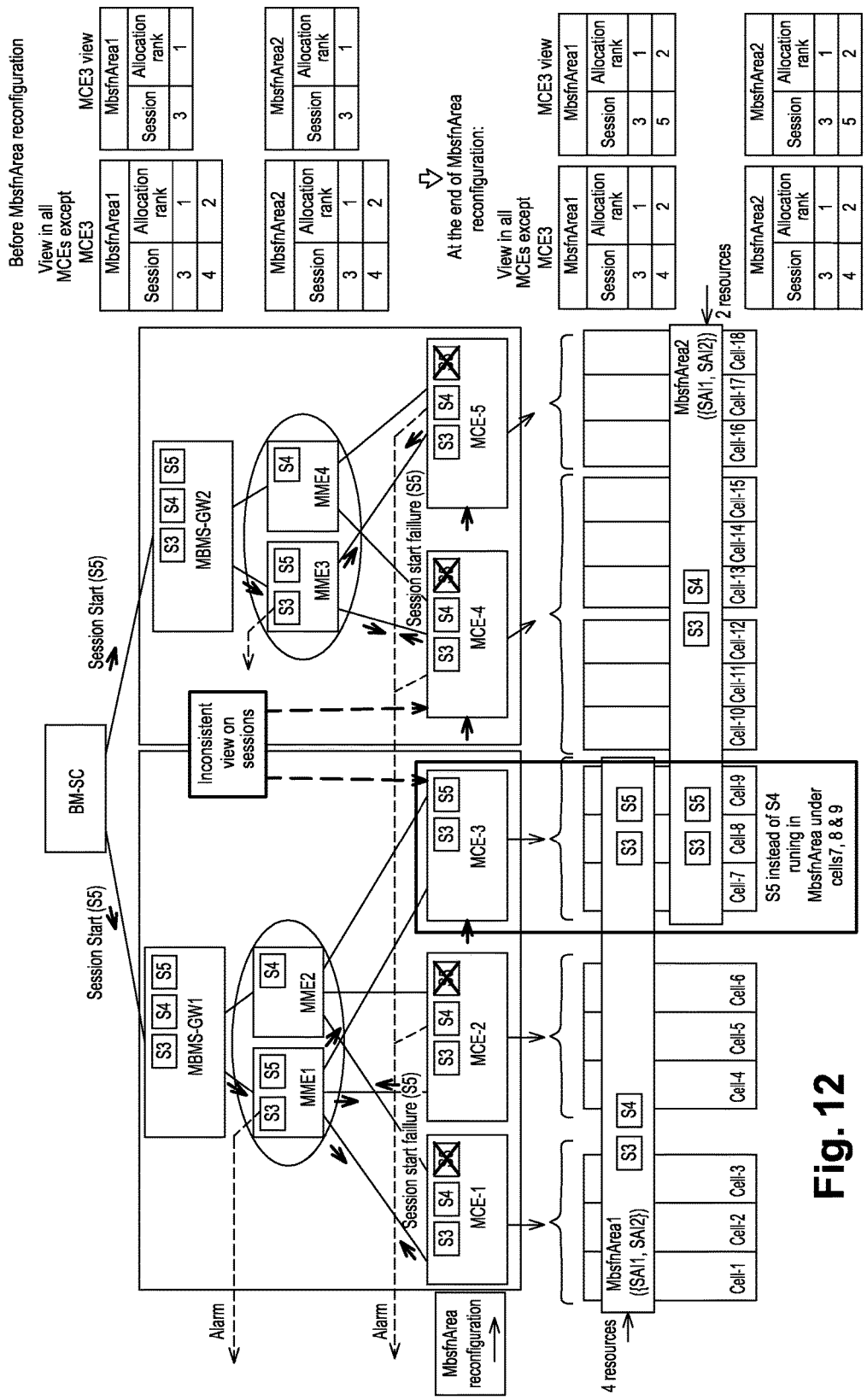

Note 6: in this case Cells 7, 8 & 9 will scramble the transmission of other cells and vice-versa 6/ Eighth Example of First Set (FIG. 12)

Starting from 5", Session S5 Started

At the time the session S5 is started, the MCE re-assesses the allocation according to the ARP criteria (neutral criteria in this example since the ARP of all the remaining sessions is the same) and according to the session sequence number.

In Mbsfn Areas 1 &2 controlled by all MCEs except MCE3: the session 3 is re-admitted first (sequence number=3 & sequence number 1 &2 have disappeared—should not be reallocated by the server for a given period), then session 4 is admitted (sequence number=4 & now enough available resource)

In Mbsfn Areas 1 &2 controlled by MCE3: allocation for session 1 is calculated again At the end of S5 start:
- Sessions 3 & 4 are active in MbsfnAreas not controlled by MCE3
- Sessions 3 & 5 are active in MbsfnAreas controlled by MCE3
- MMEs 1, 3 & 4 know that sessions 3 and 4 are running and that session 5 has been rejected.
- MME2 knows that sessions 3 and 5 are running
- The RAN operator is informed by MCE 1, 2, 4 & 5 that there are enough resources in Mbsfn Areas 1 & 2

Note 7: in this case Cells 7, 8 & 9 will even more likely highly scramble the transmission of other cells and vice-versa Conclusion: the Solution-1 is not sufficient, therefore the principle [REQ7] for MCE to accept the session from MME (but in a 'suspended' state) even if there are not enough resources to admit the session in at least one MbsfnArea controlled by the MCE. This, provided that the MCE has the capability to handle successfully the session if it would have enough resources—session parameter combination supported- and of course the session request is valid from 3GPP standard viewpoint.

Second Set of Examples

FIG. 13 illustrates an example of session and associated parameters considered for this second set of examples.

This set of examples illustrates the system behavior for MBMS sessions with a different set of pre-emption vulnerability and capability indicators. This results in the same outcomes as for the first set of examples.

Initial conditions: 4 radio resources are available for MBMS services in each MCE and for each Mbsfn Area.

Figure 14:
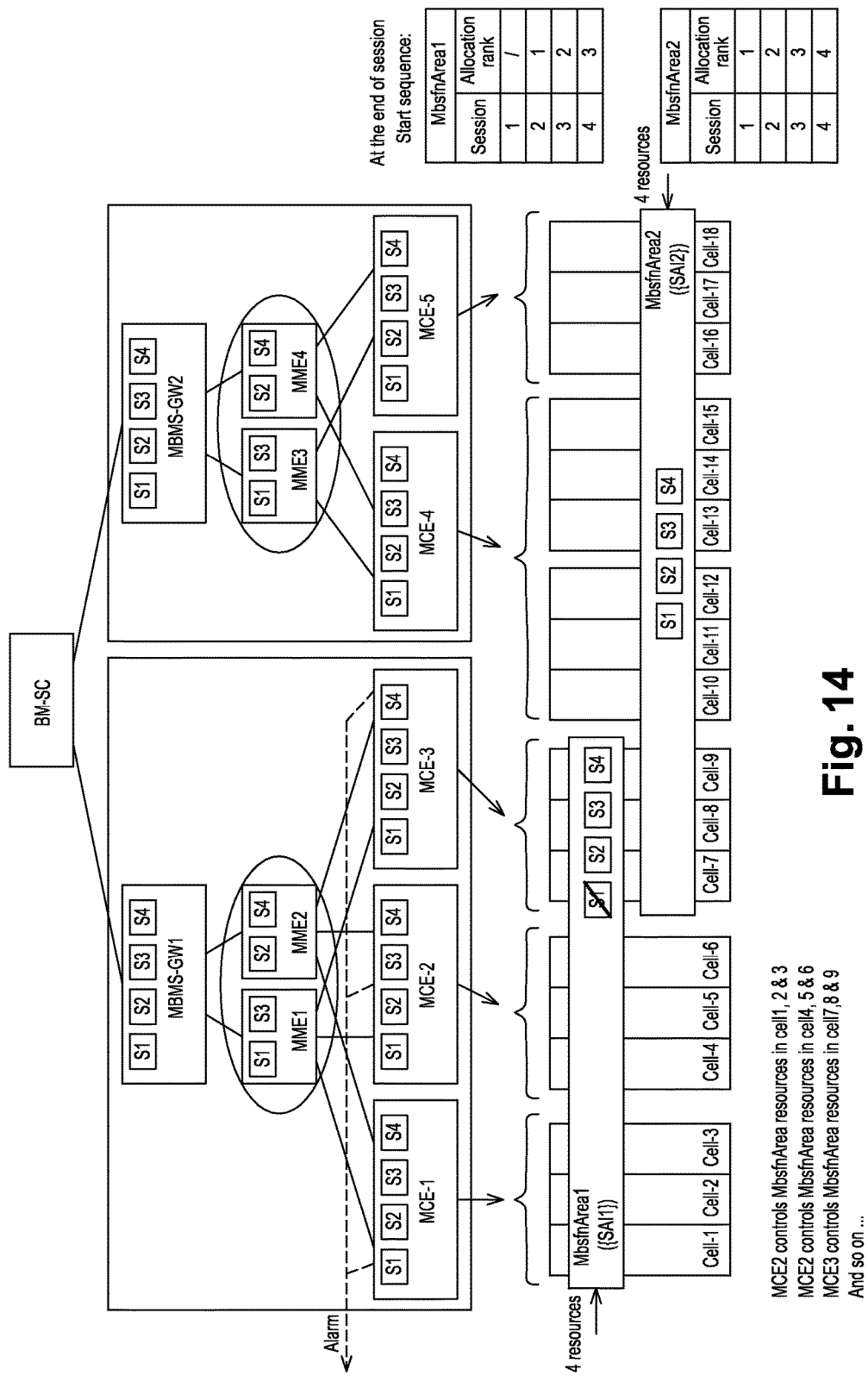

1/ First example of second set (FIG. 14)

The following sessions are initiated in sequence:

Start session 1 (started in MCEs, active in MbsfnArea1 & 2)

Start session 2
- not enough resources to accommodate S2 in MbsfnArea1=>S2 pre-empts S1
- S2 active in MbsfnArea1 & 2
- S1 active in MbsfnArea2

Start session 3 (started in MCEs, active in MbsfnArea1 & 2)

Start session 4 (started in MCEs, active in MbsfnArea1 & 2)

At the end of the sequence:
- Sessions 2, 3, 4 are active in MbsfnArea1 (not enough resources to accommodate all sessions)
- All sessions are active in MbsfnArea2 (enough resources to accommodate all sessions)

MMEs know that sessions 1, 2, 3 and 4 are running.

The RAN operator is informed that there is not enough resources in MbsfnArea 1

Figure 15:
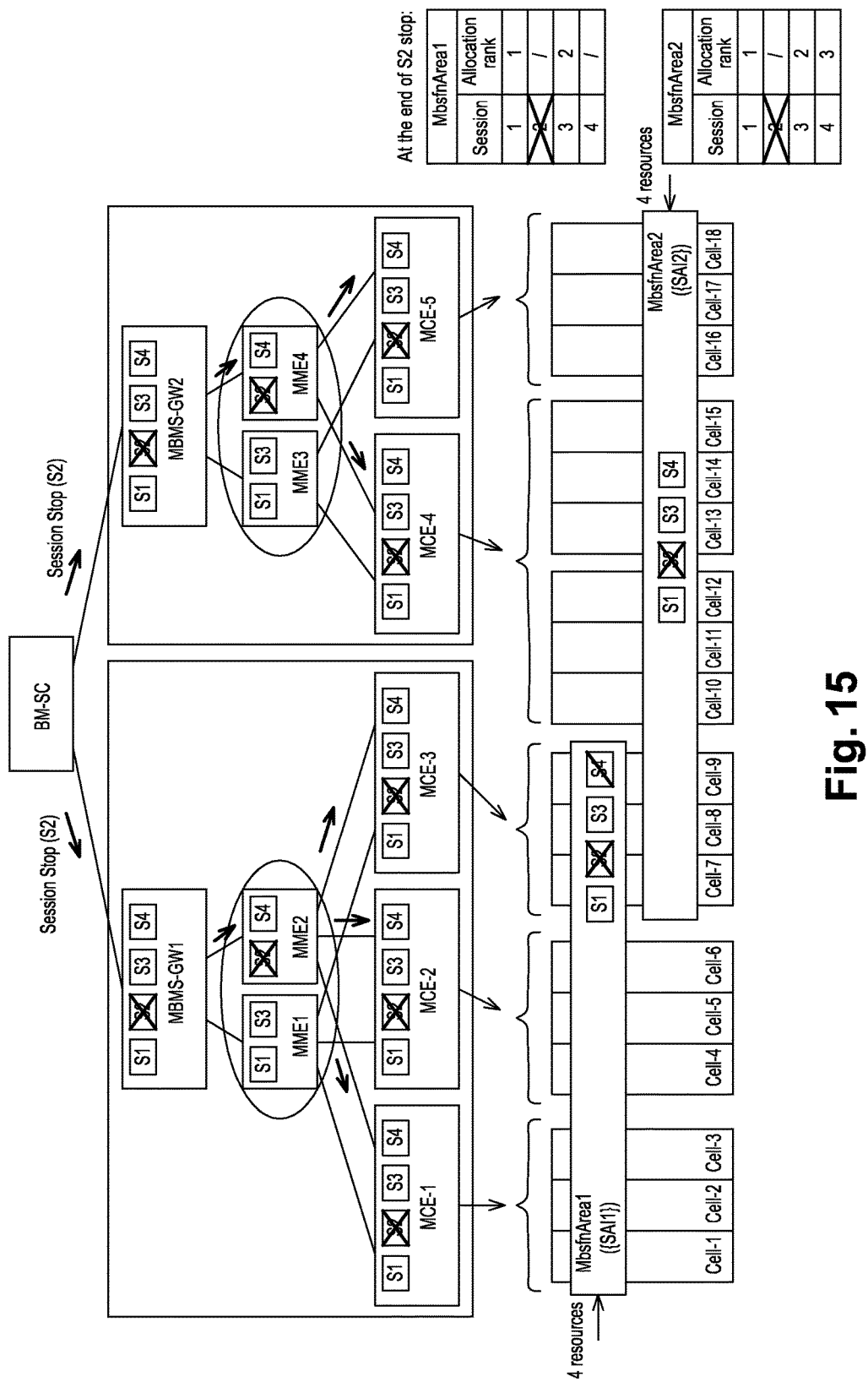

2/ Second Example of Second Set (FIG. 15)

Session S2 Stopped

Upon reception of the session stop, the MCE replays the sequence of session start for remaining sessions based on the sequence number of each individual session. At each step of the sequence the MCE takes into account the ARP criterion (ARP criterion is neutral in this example, each remaining session having the same ARP-PL and ARP indicators are not applicable for equal ARP-PL according to 3GPP).

In MbsfnArea1: During replay, the session 1 is admitted first (sequence number=1), then session 3 is admitted (sequence number=3 & sequence number 2 has disappeared—should not be reallocated by the server for a given period), then session 4 is not admitted (sequence number=4 & no more available resource; S4 ARP-PV is ignored; S4 ARP-PC is not applicable because there's NO session with lower priority).

In MbsfnArea2: all remaining sessions are admitted again (enough resources) and allocation for sessions 1, 3 & 4 is calculated again according to the new sequence of session (that is S1, S3, S4)

At the end of S2 stop:
  Sessions 1 & 3 are active in MbsfnArea1 (not enough resources to accommodate S4)
  Sessions 1, 3 & 4 are active in MbsfnArea2 (enough resources to accommodate all sessions)
  MMEs know that sessions 1, 3 and 4 are running.

The RAN operator is still informed that there is not enough resources in MbsfnArea 1

Figure 16:
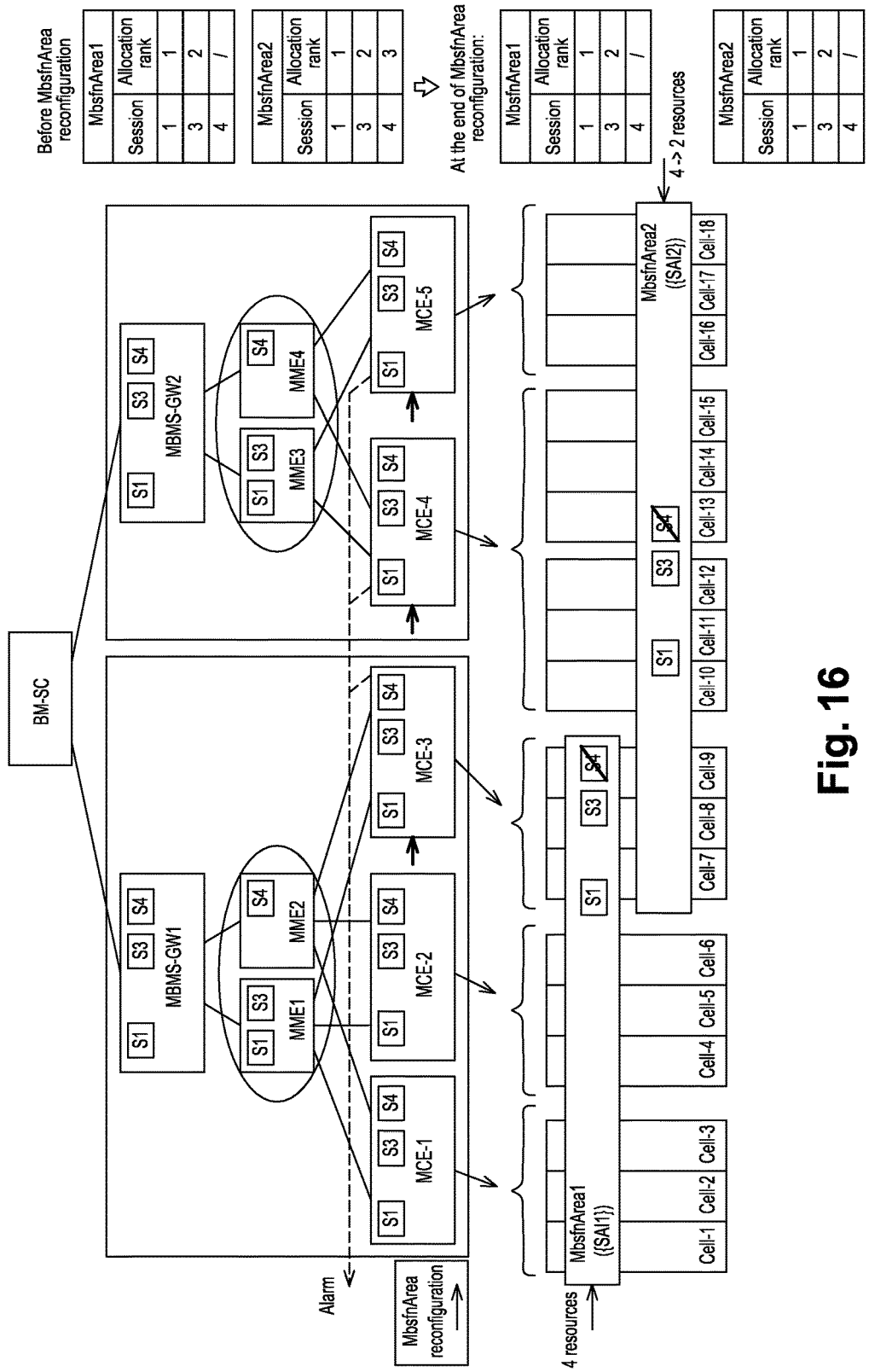

3/ Third Example of Second Set (FIG. 16)

The operator reduces the amount of allowed resources to 2 resources in MbsfnArea2

Each MCE replays the sequence of session start for remaining sessions based on the sequence number of each individual session. At each step of the sequence the MCE takes into account the ARP criterion (ARP criterion is neutral in this example, each remaining session having the same ARP-PL and ARP indicators are not applicable for equal ARP-PL according to 3GPP).

In MbsfnArea2: During replay, the session 1 is admitted first (sequence number=1), then session 3 is admitted (sequence number=3 & sequence number 2 has disappeared—should not be reallocated by the server for a given period), the session 4 not admitted (sequence number=4 & no more available resource; S4 ARP-PV is ignored; S4 ARP-PC is not applicable because there's NO session with lower priority).

In MbsfnArea1: no impact on sessions

At the end of reconfiguration of MbsfnArea2:
  Sessions 1 & 3 are active in MbsfnArea1 & 2 and session 4 is suspended (not enough resources to accommodate S4)
  MMEs see that sessions 1, 3 and 4 are running.

The RAN operator is informed that there is not enough resources in MbsfnArea 2 in addition to MbsfnArea 1

Figure 17:
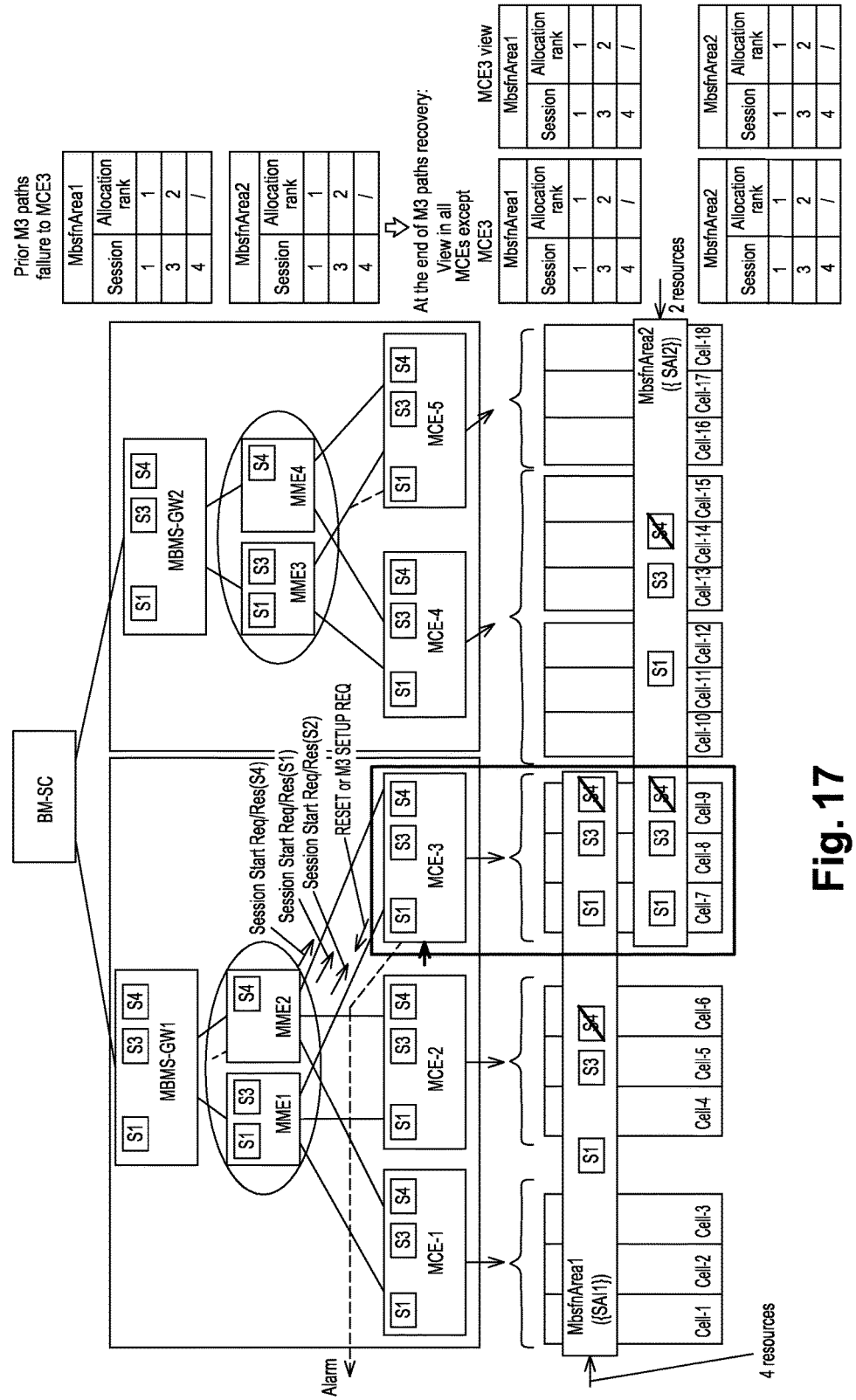

Note: In order to synchronize the MbsfnArea configuration update over radio interface (in all cells serving the MbsfnArea) resulting from MbsfnArea reconfiguration O&M operation, the MbsfnArea O&M command MAY include the absolute time (e.g. UTC time) at which the online modification should apply in cells 4/ Fourth Example of Second Set (FIG. 17)

MCE3 Needs to be Restarted Following a Maintenance Operation

MME 1 & 2 detect the loss of M3 path to MCE3 and releases the associated M3AP ID resources The MCE restarts (includes SCTP association re-establishment) and then sends a RESET or M3 SETUP REQUEST message to MME1 & MME2. The MME1 Starts the sessions in the same order as before (that is S1, S3). The MME2 starts the session4. The MCE re-assesses the allocation according to the ARP and the session sequence number.

In MbsfnArea1 &2: S1 is admitted first (sequence number=1 (If request for S4 received prior request for S1, the MCE will replay the sequence starting from S1, i.e. according to each individual session sequence number)), then S3 is admitted too (sequence number=3 & sequence number 2 has disappeared), then S4 is not admitted in any MbsfnArea controlled by MCE3 (sequence number=4 & no more available resource; S4 ARP-PV is ignored; S4 ARP-PC is not applicable because there's NO session with lower priority). S4 is accepted but in 'suspended' state.

At the end of MCE3 start:
  Sessions 1, 3 are active in MbsfnArea1 & 2 (not enough resources to accommodate S4)
  MME1 sees that sessions 1 and 3 are running. MME2 sees that session 4 is running The RAN operator is informed that there are not enough resources in MbsfnArea 1 & 2

5/ Fifth Example of Second Set (FIG. 18)

Session S5 Started

Each MCE determine that S5 should be started in MbsfnArea1 (in this example SAI1 maps to MbsfnArea1) and in MbsfnArea2 (in this example SAI2 maps to MbsfnArea2).

In MbsfnArea1: There are not enough resources to accommodate S5=>S5 pre-empts S1(S1 is of lower priority and pre-emptable). The session 3 is re-admitted first (sequence number=3 & sequence number 1&2 have disappeared—should not be reallocated by the server for a given period), then session 4 is admitted (sequence number=4 & now enough available resource) and then session 5 (sequence number=5)

In MbsfnArea2: There are not enough resources to accommodate S5=>S5 pre-empts S1 (S1 is of lower priority and pre-emptable). There's still not enough resources to admit S4.

At the end of S5 start:

Sessions 3, 4 & 5 are active in Mbsfn Area 1; Session 1 is suspended.

Sessions 3 & 5 are active in Mbsfn Area 2; Sessions 1 & 4 are suspended.

MME 1&3 know that sessions 1 and 3 are running

MME 2&4 know that sessions 4 and 5 are running

The RAN operator knows that there are not enough resources in Mbsfn Areas 1&2

Note 1: for the MbsfnArea 1, upon receipt of the MBMS session start for the new session S5, the MCE performs a replay operation according to the principles of REQ [3], i.e. re-assesses the sessions according to the sequence (S1, S3, S4, S5). S1 and S3 are accepted first, S4 is then suspended; pre-emption is then necessary to serve S5 (with a higher priority ARP-PL); since S3 cannot be pre-empted, S1 is pre-empted. Since there are then sufficient remaining resources to serve S4, S4 is resumed too. Similar principles apply for the Mbsfn Area 2 (except that S4 cannot be resumed due to the lack of resources).

Figure 19:
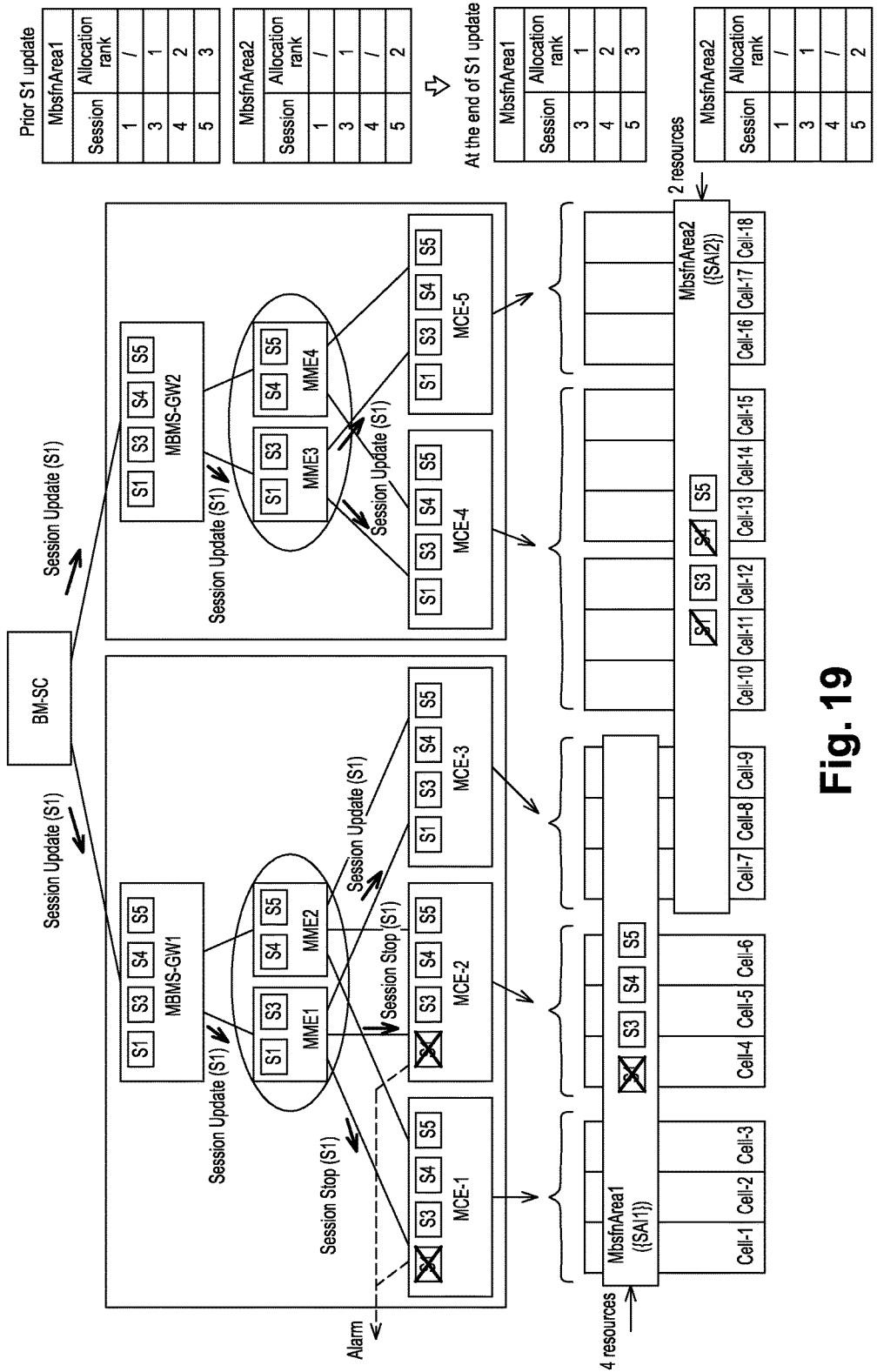
Figure 20:
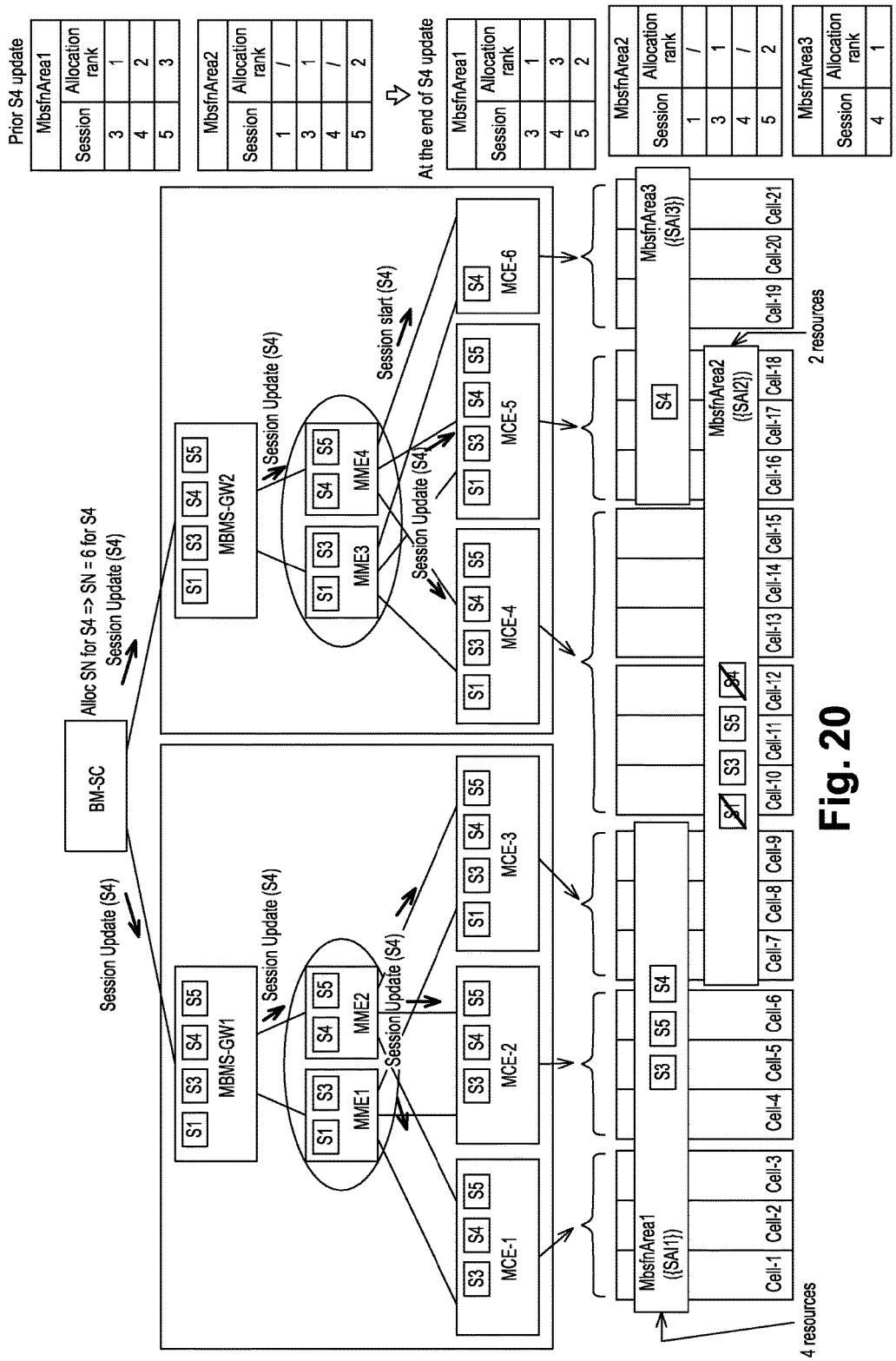
Figure 21:
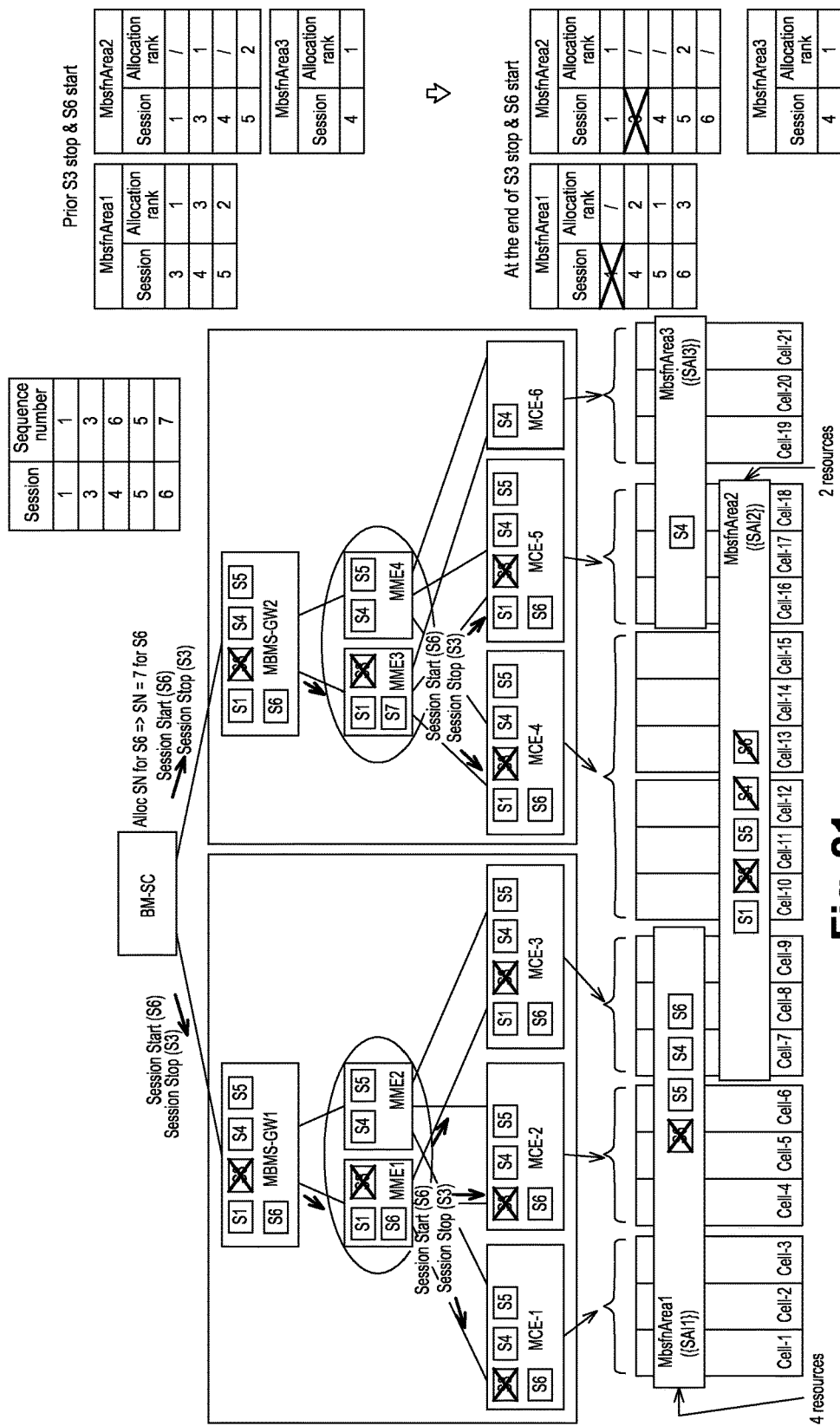

6/ Sixth Example of Second Set (FIG. 19)
Session S1 updated (coverage reduction: {SAI1, SAI2}→{SAI2}; all other session parameters unchanged, except Absolute Time)
  the session SN is kept unchanged (no need to change the SN)
    the session allocation rank of S1 is unchanged in Mbsfn Areas 1 & 2; also S1 is suspended in Mbsfn Area 2
    therefore there's no need for MCEs to reshuffle the allocation in
MbsfnArea 1 & 2 upon the session stop or update
At the end of S1 update:
Sessions 3, 4 & 5 are active in Mbsfn Area 1; Session 1 is stopped in MCE 1 &2.
Sessions 3 & 5 are active in Mbsfn Area 2; Session 1 is suspended in MCE 3 4 &5
MME 1&3 know that sessions 1 and 3 are running
MME 2&4 know that sessions 4 and 5 are running
The RAN operator knows that there are not enough resources in Mbsfn Area 2
The RAN operator is informed that there are now enough resources in Mbsfn Area 1
7/ Seventh Example of Second Set (FIG. 20)
Session S4 updated (coverage extension: {SAI1, SAI2}→{SAI1, SAI2, SAI3}; all other session parameters unchanged, except Absolute Time)
  S4 admitted in MbsfnArea 3 (MbsfnArea3 supports SAI3 in this example)
  A new session SN allocated=>the session allocation rank of S4 is changed in Mbsfn Areas 1 & 2;
At the end of S4 update:
    Sessions 3, 4 & 5 are active in Mbsfn Areas 1; Session 1 is stopped in MCE1&2.
    Sessions 3 & 5 are active in Mbsfn Area 2; Sessions 1 & 4 are suspended in MCE3, 4 & 5;
    Session 4 is active in Mbsfn Area 3;
    MME 1&3 know that sessions 1 and 3 are running; MME 2&4 know that session 4 and 5 are running
      Note 2: If a session is updated to extend its coverage a new session SN is allocated and then applied. The new session SN is applied in all MbsfnAreas impacted by this session (including the old one) leading to possible allocation reshuffling operations in MbsfnAreas where the session was already running.
8/ Eighth Example of Second Set (FIG. 21)
Session S6 Started and S3 Stopped Simultaneously; Also Each Session Request Includes the Same Absolute Time
  Each MCE determines that S6 should be started in MbsfnArea1 (in this example SAI1 maps to MbsfnArea1) and in MbsfnArea2 (in this example SAI2 maps to MbsfnArea2).
  In MbsfnArea1: During replay (taking into account that S3 is stopped), the S5 is admitted first (sequence number=5 & sequence number 1, 2 & 3 have disappeared & sequence number 4 is no more used—should not be reallocated by the server for a given period), then S4 is admitted (sequence number=6), then S6 is admitted (sequence number=7)
  In MbsfnArea2: During replay (taking into account that S3 is stopped), the S1 is admitted first (sequence number=1), then S5 is admitted (sequence number=5 & sequence number 2 & 3 have disappeared & sequence number 4 is no more used & frozen), then S4 is not admitted in MbsfnArea2 (sequence number=6 & no more available resource; S4 ARP-PV is ignored; S4 ARP-PC is not applicable because there's NO session with lower priority) and put in 'suspended' state, then S7 is not admitted in MbsfnArea2 (sequence number=6 & no more available resource; S6 ARP-PC is not applicable because there's NO session with lower priority)
  At the end of S6 start & S3 stop:
    In Mbsfn Area 1, Sessions 4, 5 & 6 are active
    In Mbsfn Area 2, Sessions 1 & 5 are active and Sessions 4 & 6 are suspended
    In Mbsfn Area 3, Session 4 is active
    MME 1&3 know that sessions 1 and 6 are running
    MME 2&4 know that sessions 4 and 5 are running
  Note: the above case illustrates how the allocation rank is determined based on the session sequence number. The session sequence number ensures a deterministic ranking of the sessions in the MbsfnAreas controlled by several MCEs.

Third Set of Examples

Figure 23:
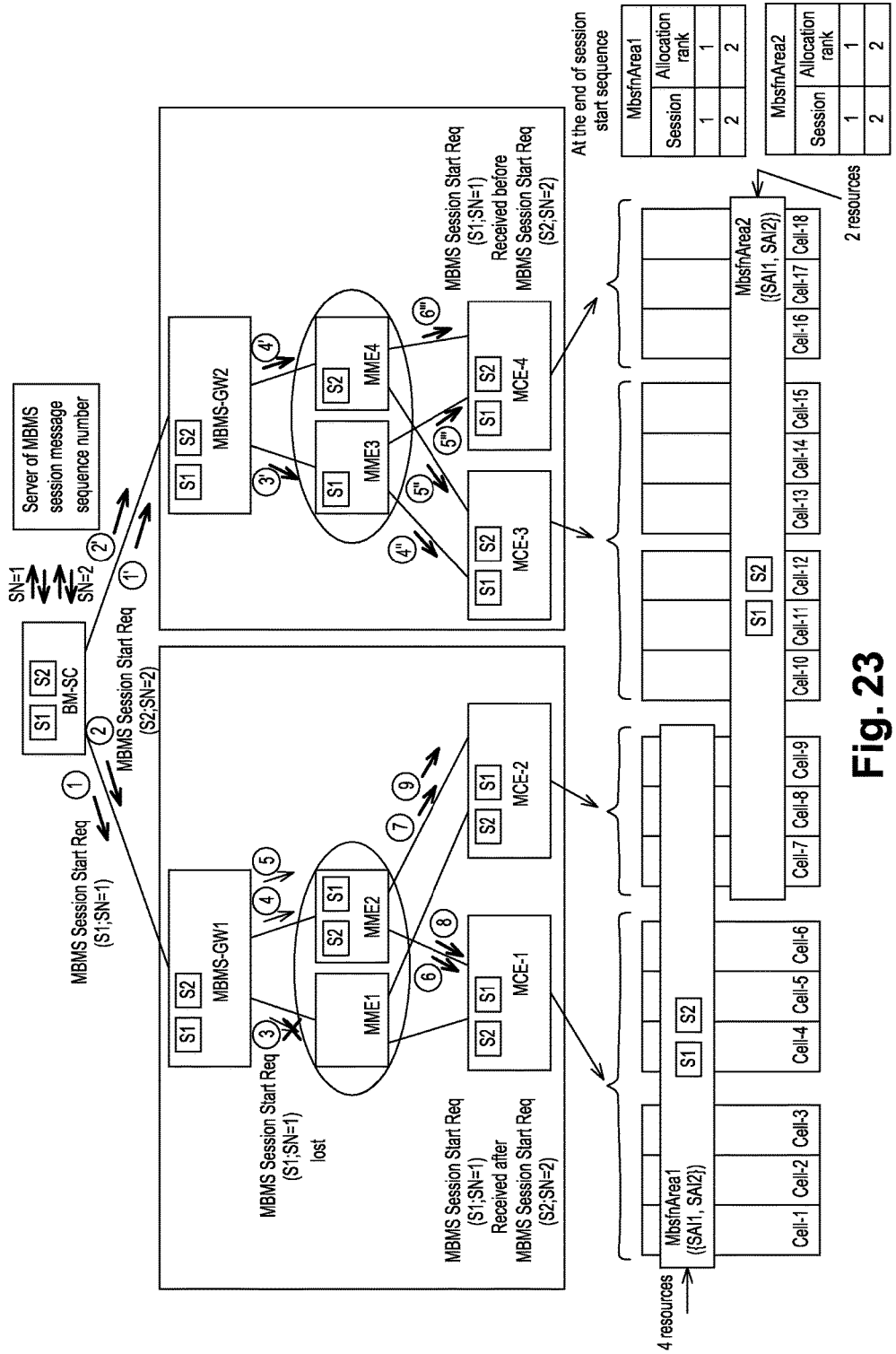
Figure 24:
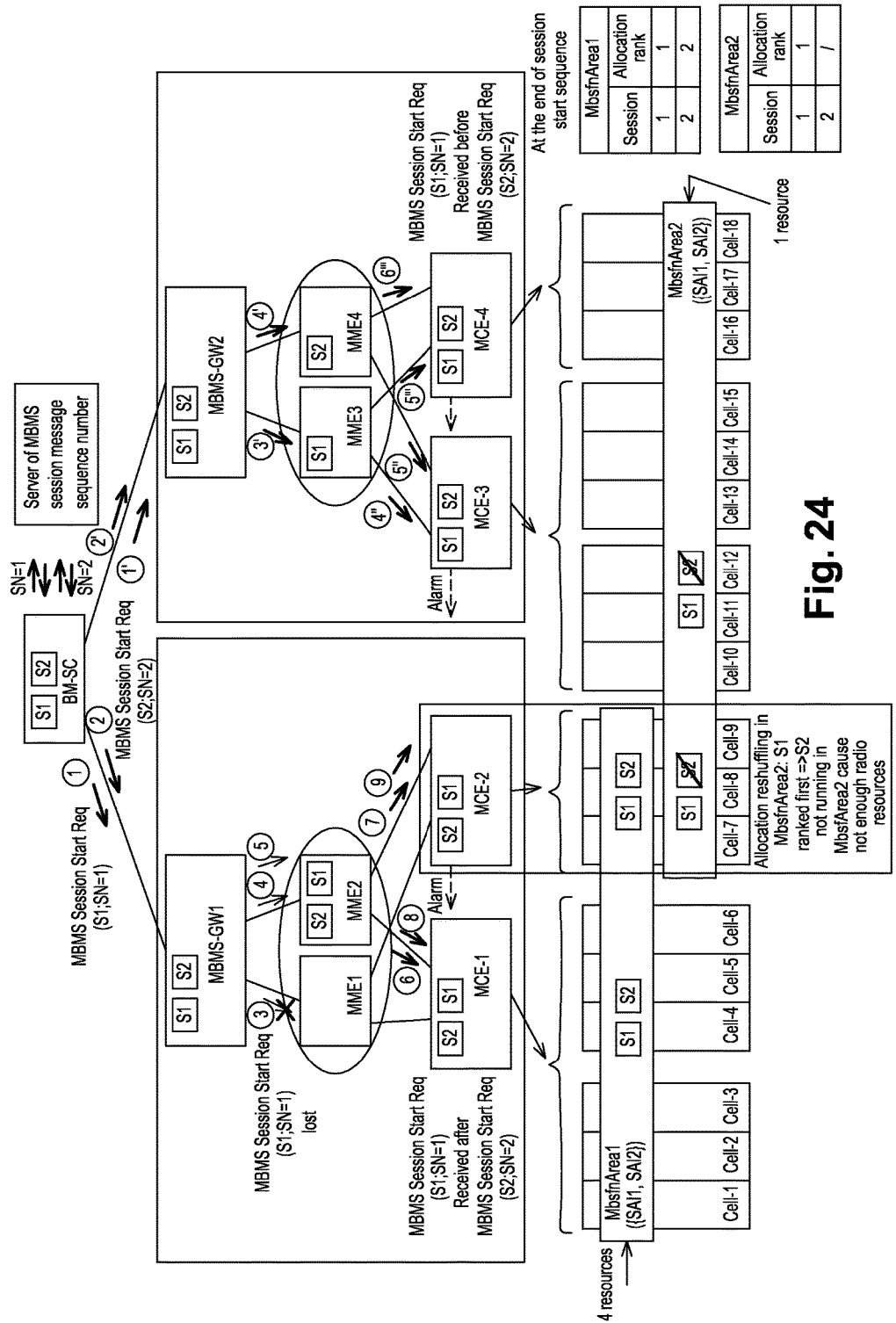

FIG. 22 illustrates an example of session and associated parameters considered for this third set of examples.
This example illustrates that the solution works fine also if the MBMS Session Start requests are received in a different order by different MCEs of the same Mbsfn Area (thanks to the use of the Sequence Number).
Extract from 3GPP TS 36.444: If the MCE determines that the E-UTRAN is not able to accommodate the requested configuration for any MBSFN area of the requested service area (e.g. the necessary MBMS resources for the MBMS Session could not be established in any MBSFN area of the requested service area), the MME shall be informed by the MBMS SESSION START FAILURE message including a suitable cause value.
3 cases
  Case-1/ full success=>MCE answer=MBMS Session Start Response
  Case-2/ partial success (session admitted in at least one MBSFN area & session not admitted in at least one MBSFN area)=>MCE answer=MBMS Session Start Response
  Case-3/ failure (No radio resources available in all MbsfnAreas controlled by the MCE)=>MCE answer=MBMS Session Start Failure
  Case-3/ handled as following: =>MCE answer=MBMS Session Start Response. The session is suspended.
1/First Example of Third Set (FIG. 23)
De-sequencing due to MBMS session request message loss over Sm path & enough reources in Mbsfn Areas
  Example:
    Two sessions (S1 & S2) to be started at same time
    Session S1 is to be ranked in first position
    Session S2 is to be ranked in second position
2/Second Example of Third Set (FIG. 24)
De-Sequencing Due to MBMS Session Request Message Loss Over Sm Path & NOT Enough Resources in MbsfnArea 2
  Example:
    Two sessions (S1 & S2) to be started at same time
    Session S1 is to be ranked in first position
    Session S2 is to be ranked in second position
    ARP criterion is neutral in this example since the ARP-Priority Level of all sessions is the same.
    Note 1: Embodiments and/or aspects of the invention include the principle above (i.e. MCE shall use the sequence number to determine the MBMS session to serve in priority in case of shortage of MBMS radio resources, during MBMS session start, MBMS session update and MBMS session stop procedures).

Note 2: the session S1 is accepted in the example above (and the session S2 preempted by MCE3) regardless of the value of the ARP Pre-emption vulnerability of the already admitted session S2, i.e. the MCE re-assesses the sessions to schedule according to the ARP priority level (same here for all sessions) and then the sequence number.

Figure 25:
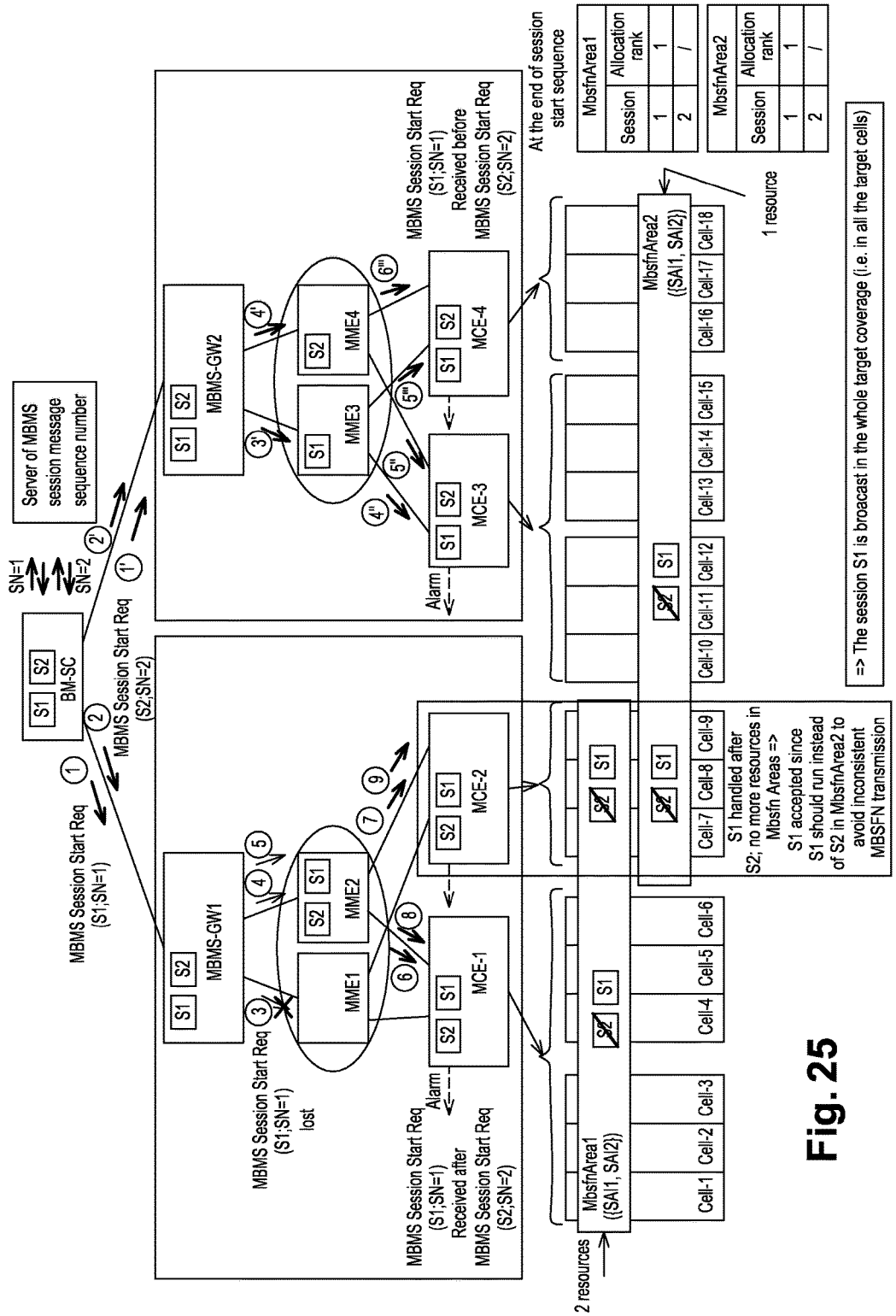

3/Third Example of Third Set (FIG. 25)

De-sequencing due to MBMS session request message loss over Sm path & NOT enough resources in Mbsfn Areas Example:
Two sessions (S1 & S2) to be started at same time
Session S1 is to be ranked in first position
Session S2 is to be ranked in second position
Solution to cope with the issue (auto-corrective action):
Solution to cope with the issue (self-corrective action):
The MCE shall use the Sequence Number to determine the MBMS sessions to schedule in presence of shortage of MBMS radio resources. Since S1 is ranked first, the MCE shall accept the MBMS Session Start request for that session and pre-empt the session S2, cause not enough radio resource

Fourth Set of Examples—eMBMS and MOCN (Multi-Operator Core Network)

Figures 26, 27:
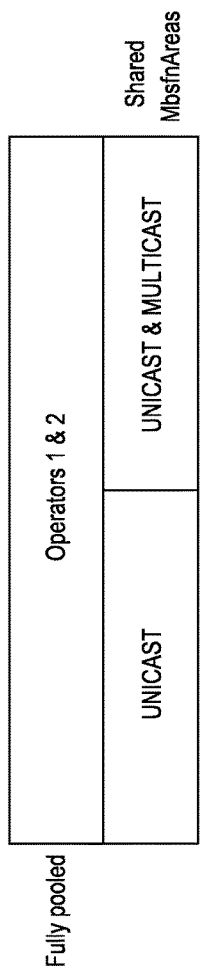

FIG. 26 illustrates eNB resources allocation strategies (two operators sharing one MCE and one eNB)

FIG. 27 illustrates an example of session and associated parameters considered for this fourth set of examples.

Figure 28:
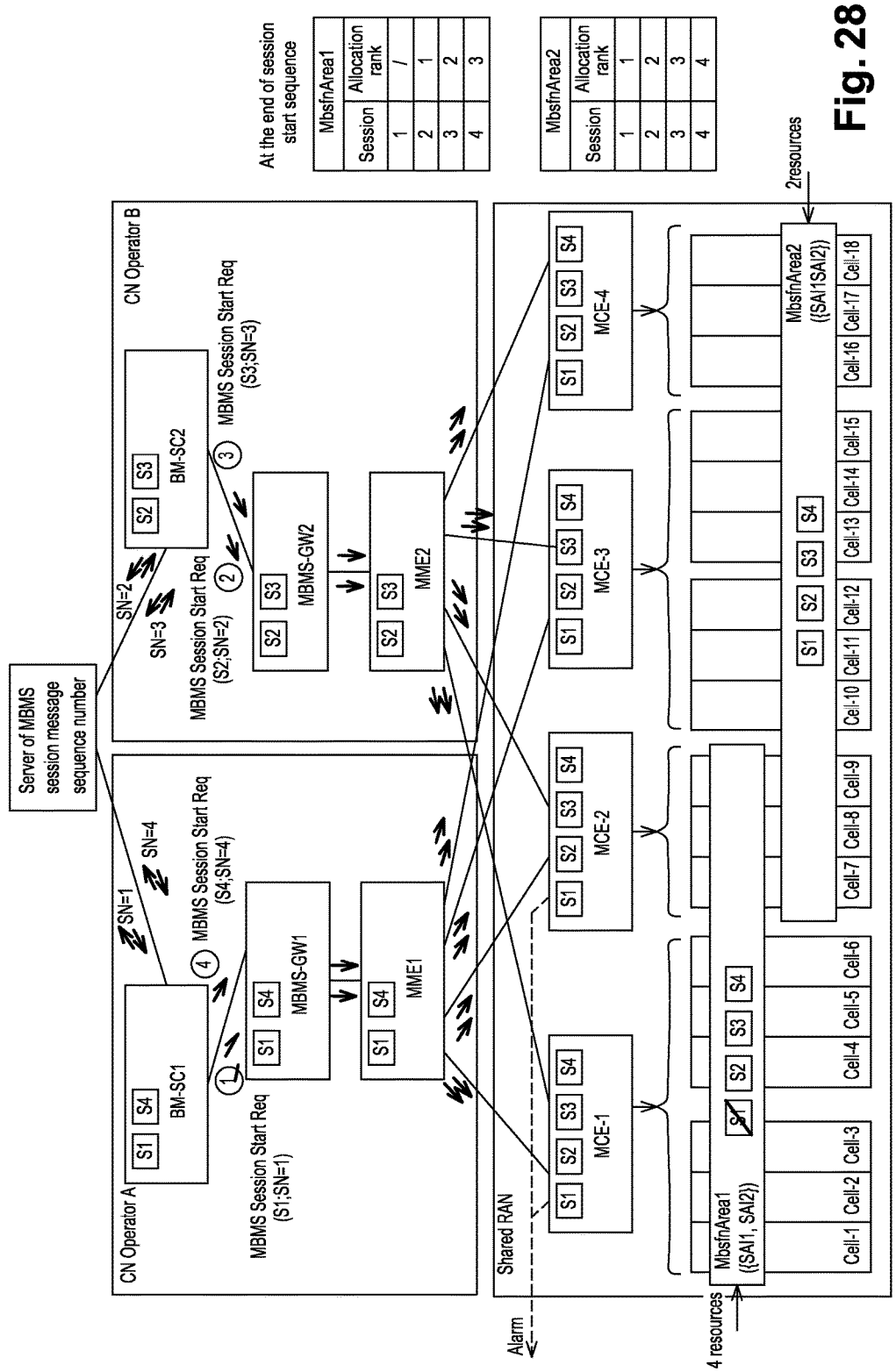

In this example {SAI1, SAI2} and {SAI1', SAI2'} map to the same set of Mbsfn Areas 1/ First Example of the Fourth Set (FIG. 28)

The following sessions are initiated in sequence:
Start session 1 (started in MCEs, active in MbsfnArea1 & 2)
Start session 2
  not enough resources to accommodate S2 in MbsfnArea1=>S2 pre-empts S1
  S2 active in MbsfnArea1 & 2
  S1 active in MbsfnArea2
Start session 3 (started in MCEs, active in MbsfnArea1 & 2)
Start session 4 (started in MCEs, active in MbsfnArea1 & 2)
At the end of the sequence:
Sessions 2, 3, 4 are active in MbsfnArea1 (not enough resources to accommodate all sessions)
All sessions are active in MbsfnArea2 (enough resources to accommodate all sessions)
MMEs know that sessions 1, 2, 3 and 4 are running.
The RAN operator is informed that there is not enough resources in MbsfnArea 1

Figure 29:
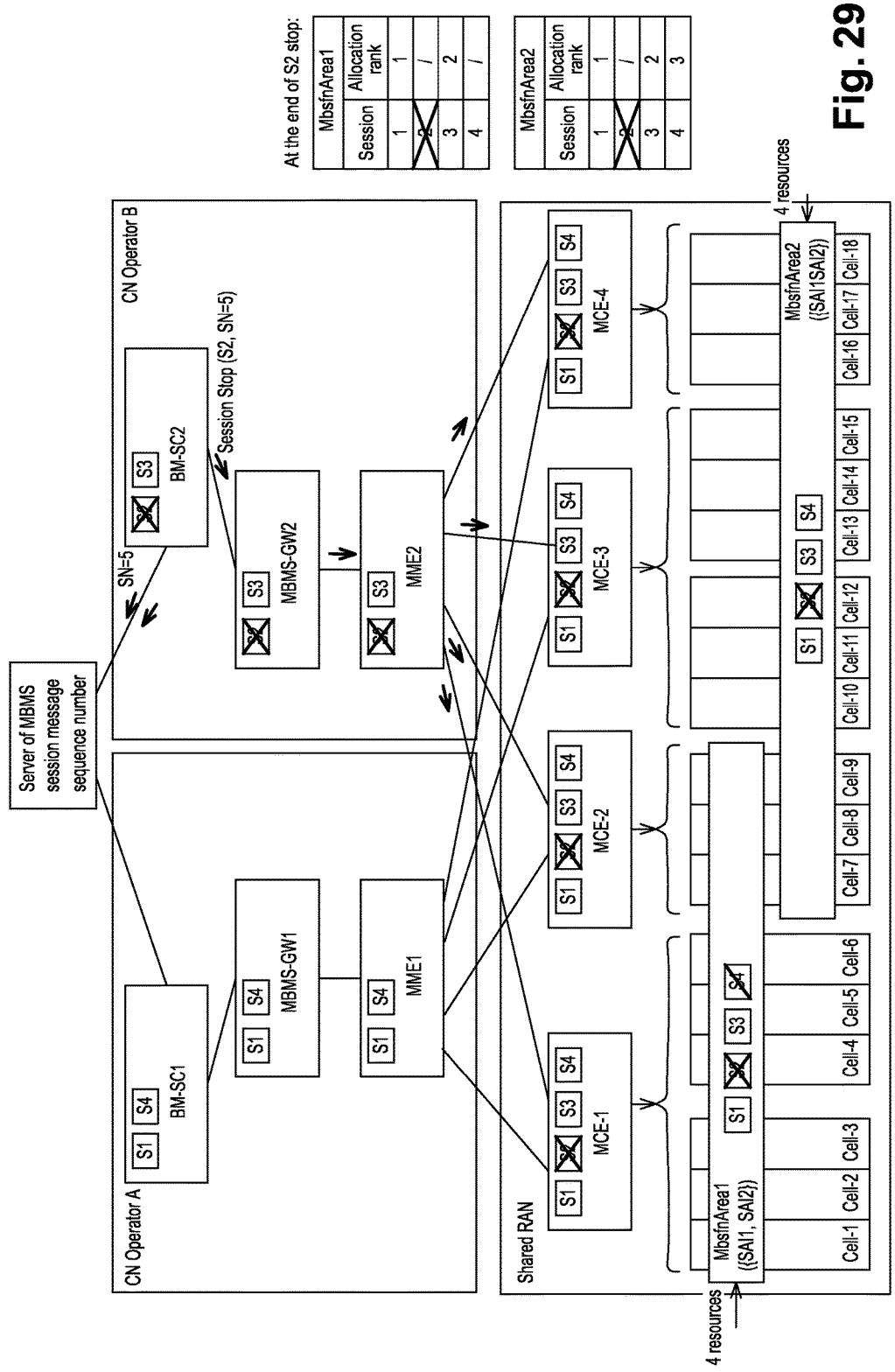

2/ Second Example of the Fourth Set (FIG. 29)
Session S2 Stopped
At the time the session 2 is stopped, the MCE re-assesses the allocation according to the ARP criteria (neutral criteria in this example since the ARP of all the remaining sessions is the same) and according to the session sequence number.
In MbsfnArea1: the session 1 is admitted again (sequence number=1), the session 3 is admitted too (sequence number=3 & sequence number 2 has disappeared—should not be reallocated by the server for a given period), the session 4 is not admitted (sequence number=4 & no more available resource)

In MbsfnArea2: allocation for sessions 1, 3 & 4 are re-calculated again
At the end of S2 stop:
Sessions 1, 3 are active in MbsfnArea1 (not enough resources to accommodate S4)
Sessions 1, 3 & 4 are active in MbsfnArea2 (enough resources to accommodate all sessions)
MMEs know that sessions 1, 3 and 4 are running.
The RAN operator is still informed that there is not enough resources in MbsfnArea 1
Note 1: Not shown in the figures. The Server of MBMS session SN might be hosted on the BM-SC of both operators in an active/standby redundancy scheme. If the BM-SC of CN operator A fails, the server of SN hosted on the BM-SC of Operator B should automatically become active if in standby state prior the failure. The standby SN server is continuously updated with the SN data of the active SN server.

Comparison between using an explicit Session Sequence Number from the BM-SC and using an implicit Session Sequence Number derived in MCEs.

a) option 1—Centralized SN server (one unique active SN server)
The SN can be a continuous number. E.g.
SN is a counter modulo N (range 0 . . . N−1), where N=e.g. 2**32
SN could also be the gpsTime (number of ms relative to GPS EPOC)
Pros:
ensures fairness (FIFO) if several BM-SC(s), e.g. Centralized SN allocation ensures fairness between sessions of different operators
Cons:
complexity (new interfaces between BM-SC nodes, synchronized allocation of SN across BM-SCs, defense mechanisms upon failure of other BM-SC nodes or interfaces)
SGmb, Sm & M3 interfaces impacted (new IE)

b) option 2—BM-SC distributed SN server (one active SN server per BM-SC)
The SN can be calculated as a hierarchical number. E.g.
SN=<counter modulo N—# bits used for BmScNumber><BmScNumber>
SN=<gpsTime><BmScNumber>, where gpsTime=number of ms relative to GPS EPOC
with 2 BM-SCs serving the same MbsfnArea, BM-SC1 & BM-SC2 assigns even and odd numbers respectively.
Pros:
ensures fairness (FIFO) if one BM-SC in use;
still able to provide fairness between sessions with different gpsTime if several BM-SC(s)
easy implementation: no centralized/synchronized allocation of SN across BM-SCs, no specific defense mechanisms upon failure of other BM-SC nodes or interfaces
Cons:
SGmb, Sm & M3 interfaces impacted (new IE)
Fairness (FIFO) not always ensured between sessions started by different BM-SCs c) option 3—MCE distributed (one unique SN function calculation performed by all MCEs)
E.g. SN is derived from tuple (M3absTime, TMGI-serviceIdentity, TMGI-plmnId)
Pros:
ensures fairness (FIFO) for different M3absTime
no interface impacted Cons:
- fairness (FIFO) between sessions of same M3absTime not always ensured (e.g. between sessions initiated by different BM-SCs/operators in RAN sharing deployment)
- intermediate nodes MBMS-GW or MME have no right to change the M3absTime following e.g. a failure recovery to ensure that M3absTime always in the future
- session reshuffling uselessly performed in some cases e.g. session update related to coverage reduction, session update with session id only modification, that might lead to suspend the on-going updated session in case of MBMS radio resources shortage In one aspect, there is provided a method for resource allocation to MBMS services for MBSFN transmission in an MBSFN Area in a mobile communication system, said resource allocation including an assessment of a list of MBMS sessions to be scheduled for said MBSFN transmission, a method wherein a Sequence Number SN is used for said assessment, said SN determining the rank of an MBMS session in a sequence of MBMS sessions scheduled by one or more BM-SC(s) for said MBMS services, said rank of said MBMS session in said sequence being used in said assessment to determine a rank of said MBMS session in said list.

Various embodiments are provided, which may be used alone or in combination, according to various combinations.

In an embodiment, in case resources available for said MBSFN transmission in said MBSFN Area are sufficient, the rank of said MBMS sessions in said list is determined based on said SN.

In an embodiment, in case resources available for said MBSFN transmission in said MBSFN Area are not sufficient, and in case different MBMS sessions have different levels of ARP priority, the rank of said MBMS sessions in said list is determined based on said SN, on said ARP priority and the pre-emption capability and vulnerability of each session, said assessment including first pre-empting a pre-emptable session with a lowest ARP priority, and with a SN identifying a session most recently scheduled by a BM-SC in case of several sessions having a same lowest ARP priority level.

In an embodiment, in case resources available for said MBSFN transmission in said MBSFN Area are not sufficient, and in case MBMS sessions have same level of ARP priority, the rank of said MBMS sessions in said list is determined based on said SN.

In an embodiment, said method comprises:
a mobile communication network entity such as BM-SC, MBMS-GW, MME or S4-SGSN transmitting a SN in a MBMS Session Start Request message or in a MBMS Session Update Request.

In an embodiment, said method comprises:
a mobile communication network entity such as MCE storing a SN in a MBMS Session context.

In an embodiment, said method comprises:
a mobile communication network entity such as BM-SC requesting a SN allocation Server to generate a SN when there is a need to start an MBMS session, and optionally requesting a SN allocation Server to generate a SN when there is a need to update an MBMS session.

In an embodiment, said method comprises:
a SN Server generating a SN upon request from a mobile communication network entity such as BM-SC.

In an embodiment, said method comprises:
if a SN is not received by a MCE in a MBMS Session Start Request or MBMS Session Update Request over M3 interface, said MCE deriving a SN from a same set of rules across MCEs.

In an embodiment, said method comprises:
if a SN is not received by a MCE in a MBMS Session Start Request or MBMS Session Update Request over M3 interface, said MCE deriving a SN from the tuple (M3 absolute time, TMGI-serviceIdentity, TMGI-PLMN-ID) received in said MBMS Session Start Request or MBMS Session Update Request message, where
- 'M3 absolute time' is used as $1^{st}$ criterion for SN determination
- TMGI-serviceIdentity is used as $2^{nd}$ criterion for SN determination, useful only if there are several sessions with the same 'M3 absolute time',
- TMGI-PLMN-ID is used as $3^{rd}$ criterion for SN determination, useful only if there are several sessions with the same 'M3 absolute time' & same TMGI-serviceIdentity.

In an embodiment, said method comprises:
at least one MCE in said MBSFN Area performing said resource allocation.

Other embodiments may be provided, including other above-described embodiments.

In another aspect, there is provided a method for resource allocation to MBMS services for MBSFN transmission in an MBSFN Area in a mobile communication system, said resource allocation including an assessment of a list of MBMS sessions to be scheduled for said MBSFN transmission, said method including performing a re-assessment of said list of MBMS sessions at any one of a Session Start, a Session Update, a Session Stop or an MBSFN Area re-configuration, as if starting from scratch a sequence of MBMS Session Start requests was received requesting the starting of MBMS sessions.

Various embodiments are provided, which may be used alone or in combination, according to various combinations.

In an embodiment, said re-assessment is performed as if said sequence was received beginning with a session less recently scheduled by one or more BM-SC(s) for said MBMS services, and terminating with a session most recently scheduled by said BM-SC(s).

In an embodiment, a Sequence Number SN determining the rank of an MBMS session in a sequence of MBMS sessions scheduled by said BM-SC(s) is used to determine said session less recently scheduled by said BM-SC(s) and said session most recently scheduled by said BM-SC(s).

In an embodiment, said method comprises:
at least one MCE in said MBSFN Area performing said resource allocation.

Other embodiments may be provided, including other above-described embodiments.

In another aspect, there is provided a method for resource allocation for MBSFN transmission in an MBSFN Area for MBMS service in a mobile communication system, a method wherein, in the absence of sufficient resources to serve a new MBMS Session Start Request at the time this request is received, this new MBMS session is admitted but marked as suspended, i.e. not broadcast over radio until adequate resources become available.

Various embodiments are provided, which may be used alone or in combination, according to various combinations.

In an embodiment, said method comprises:
at least one MCE in said MBSFN Area performing said resource allocation.

Other embodiments may be provided, including other above-described embodiments.

In other aspects, there are provided entities configured to carry out such method(s), said entities including, in particular (though not exclusively), MBMS Control Entity (MCE), MME or S4-SGSN, MBMS GW, BM-SC, and Sequence Number server.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. A method for resource allocation to Multimedia Broadcast/Multicast Services (MBMS) services for Multimedia Broadcast multicast service Single Frequency Network (MBSFN) transmission in an MBSFN Area in a mobile communication system, said resource allocation including an assessment of a list of MBMS sessions to be scheduled for said MBSFN transmission, said method including:
performing by all Multi-cell/multicast Coordination Entities (MCEs) of said MBSFN Area, a re-assessment of said list of MBMS sessions, at every Session Start, Session Update, Session Stop or MBSFN Area re-configuration, as if a sequence of MBMS Session Start requests was received requesting the starting of all MBMS sessions previously started and non stopped, in the order in which said previously started and non stopped MBMS sessions were started, wherein a Sequence Number (SN) is used to determine said order, said SN determining the rank of an MBMS session in a sequence of MBMS sessions scheduled by one or more Broadcast Multicast-Service Center(s) (BM-SCs) for said MBMS services.

2. The method according to claim 1, comprising:
a MCE receiving a SN in a MBMS Session Start Request message or in a MBMS Session Update Request.

3. The method according to claim 1, comprising:
a MCE storing a SN in a MBMS Session context.

4. The method according to claim 1, wherein:
a SN is generated by a SN allocation Server upon request from a BM-SC when there is a need to start an MBMS session, or when there is a need to update an MBMS session.

5. The method according to claim 1, comprising:
in response to a SN is not being received by a MCE in a MBMS Session Start Request or MBMS Session Update Request over M3 interface, said MCE deriving a SN from a same set of rules across MCEs.

6. The method according to claim 1, comprising:
a SN is not received by a MCE in a MBMS Session Start Request or MBMS Session Update Request over M3 interface, said MCE deriving a SN from a tuple including M3 absolute time, Temporary Mobile Group Identity (TMGI-serviceIdentity), TMGI-Public Land Mobile Network PLMN-ID received in said MBMS Session Start Request or MBMS Session Update Request message, where:
the M3 absolute time is used as first criterion for SN determination;
the TMGI-serviceIdentity is used as second criterion for SN determination, useful only if there are several sessions with the same M3 absolute time; and
the TMGI-PLMN-ID is used as third criterion for SN determination, useful only if there are several sessions with the same M3 absolute time and same TMGI-serviceIdentity.

7. The method according to claim 1, wherein:
in the absence of sufficient resources to serve a new MBMS Session Start Request at the time this request is received, the new MBMS session is admitted but marked as suspended so that the new MBMS session is not broadcast over radio until adequate resources become available.

8. A Multi-cell/multicast Coordination Entity (MCE) of a mobile communication system supporting Multimedia Broadcast/Multicast Services MBMS and Multimedia Broadcast multicast service Single Frequency Network MBSFN mode of operation, said MCE configured to perform resource allocation to said MBMS services for MBSFN transmission in an MBSFN Area in said mobile communication system, said resource allocation including an assessment of a list of MBMS sessions to be scheduled for said MBSFN transmission, said MCE configured to perform a re-assessment of a list of MBMS sessions, at every Session Start, Session Update, Session Stop or MBSFN Area re-configuration, as if a sequence of MBMS Session Start requests was received requesting the starting of all MBMS sessions previously started and non stopped, in the order in which said previously started and non stopped MBMS sessions were started, wherein a Sequence Number SN is used to determine said order, said SN determining the rank of an MBMS session in a sequence of MBMS sessions scheduled by one or more Broadcast Multicast-Service Center(s) BM-SC(s) for said MBMS services.

9. The MCE according to claim 8, further configured to:
receive a SN in a MBMS Session Start Request message or in a MBMS Session Update Request.

10. The MCE according to claim 8, further configured to:
store a SN in a MBMS Session context.

11. The MCE according to claim 8, wherein:
a SN is generated by a SN allocation Server upon request from a BM-SC when there is a need to start an MBMS session, or when there is a need to update an MBMS session.

12. The MCE according to claim 8, further configured to:
if a SN is not received by a MCE in a MBMS Session Start Request or MBMS Session Update Request over M3 interface, derive a SN from a same set of rules across MCEs of said MBSFN Area.

13. The MCE according to claim 8, further configured to:
if a SN is not received by a MCE in a MBMS Session Start Request or MBMS Session Update Request over M3 interface, derive a SN from a tuple including M3 absolute time, Temporary Mobile Group Identity TMGI-serviceIdentity, and TMGI-Public Land Mobile Network (PLMN-ID) received in said MBMS Session Start Request or MBMS Session Update Request message, where:
M3 absolute time is used as first criterion for SN determination;

TMGI-serviceIdentity is used as second criterion for SN determination, useful only if there are several sessions with the same M3 absolute time; and TMGI-PLMN-ID is used as third criterion for SN determination, useful only if there are several sessions with the same M3 absolute time and same TMGI-serviceIdentity.

14. The MCE according to claim 8, wherein:

in the absence of sufficient resources to serve a new MBMS Session Start Request at the time this request is received, the new MBMS session is admitted but marked as suspended so the new MBMS session is not broadcast over radio until adequate resources become available.

\* \* \* \* \*